United States Patent [19]
Hira et al.

[11] Patent Number: 5,567,333
[45] Date of Patent: Oct. 22, 1996

[54] THIN FILM MAGNETIC HEAD, PROCESS FOR PRODUCTION THEREOF

[75] Inventors: Yasuo Hira; Tamaki Toba, both of Yokohama; Hirotaka Imayama, Kawasaki; Atsuko Ohkawa, Yokohama; Masayasu Fujisawa, Kanagawa-ken; Kazuo Nate, Machida; Hideki Sonobe, Odawara; Saburo Suzuki, Minamiashigara; Eisei Togawa; Hiroshi Ishizaki, both of Odawara; Yoshiki Hagiwara, Hadano, all of Japan

[73] Assignee: Hitachi, Ltd., Tokyo, Japan

[21] Appl. No.: 263,915

[22] Filed: Jun. 22, 1994

[30] Foreign Application Priority Data

| Jun. 25, 1993 | [JP] | Japan | 5-154907 |
| Dec. 10, 1993 | [JP] | Japan | 5-310110 |
| Apr. 15, 1994 | [JP] | Japan | 6-077362 |

[51] Int. Cl.$^6$ .................................................. B44C 1/22
[52] U.S. Cl. .................... 216/22; 216/41; 216/66; 216/67; 216/76; 252/79.1
[58] Field of Search ................. 216/22, 41, 49, 216/51, 58, 66, 67, 74, 75, 76, 77, 79, 80; 156/643.1, 657.1, 659.11, 662.1; 29/603; 252/79.1

[56] References Cited

U.S. PATENT DOCUMENTS

| 4,592,801 | 6/1986 | Hara et al. | 216/22 |
| 5,316,617 | 5/1994 | Kawabe et al. | 216/22 |
| 5,329,689 | 7/1994 | Azuma et al. | 216/22 X |

FOREIGN PATENT DOCUMENTS

| 60-9656A | 1/1985 | Japan . |
| 4-10208A | 1/1992 | Japan . |
| 4-276367 | 10/1992 | Japan . |
| 5-8488B | 2/1993 | Japan . |

*Primary Examiner*—William Powell
*Attorney, Agent, or Firm*—Kenyon & Kenyon

[57] ABSTRACT

A magnetic head element has one or more rails formed on the surface thereof. Each rail is formed so as to have a tapered angle of 55°–85°. To form such a rail, ion milling is conducted; the rail substrate used is allowed to have an inclination angle to 15°–60° and is rotated; and there is used, as the ion milling gas, a fluorinated hydrocarbon (e.g. $CH_2FCF_3$) gas alone or a mixed gas of said fluorinated hydrocarbon gas and Ar, $SF_6$ or the like. Accordingly, a magnetic head rail shape gives a small variation in flying height between magnetic head and magnetic disc.

20 Claims, 28 Drawing Sheets

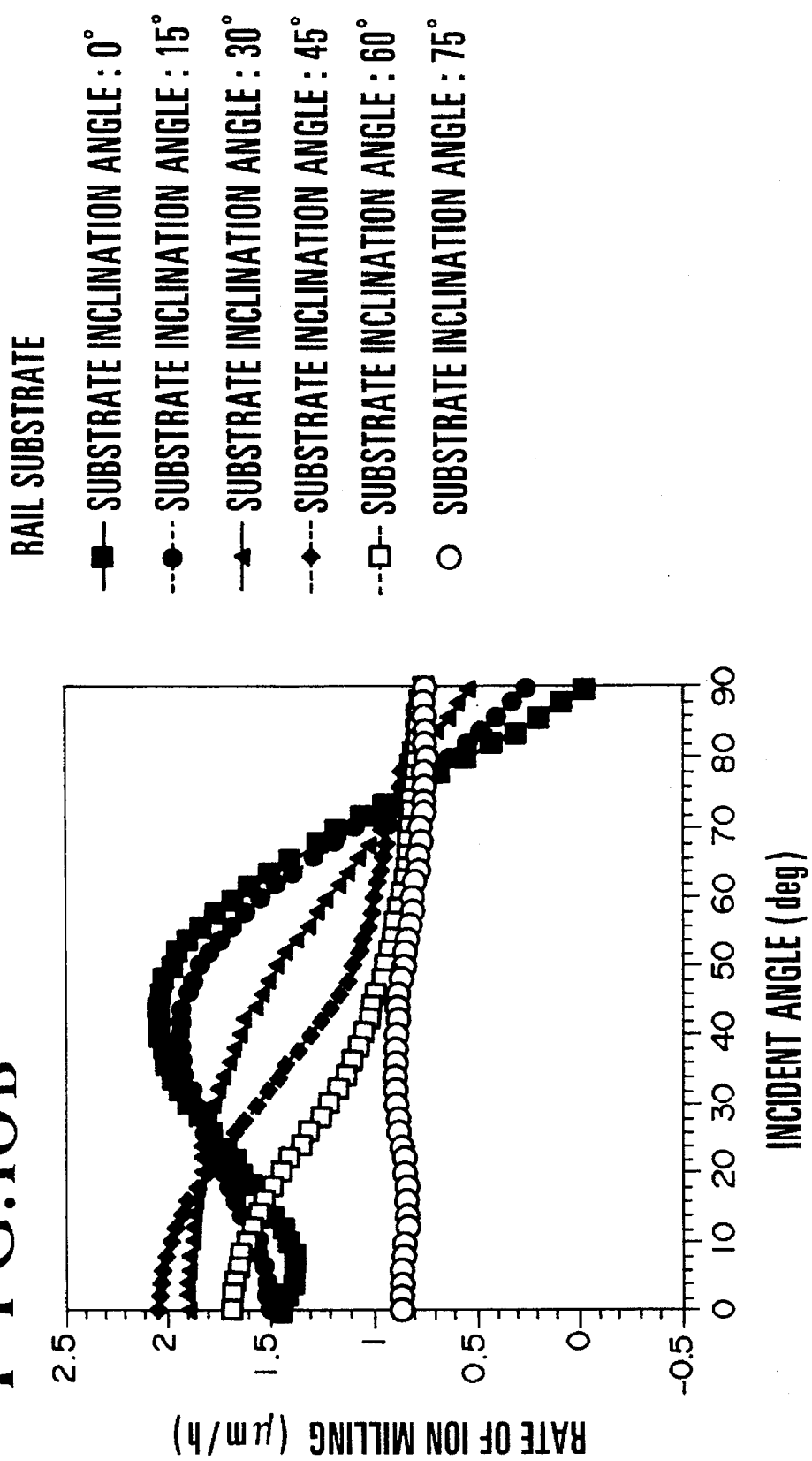

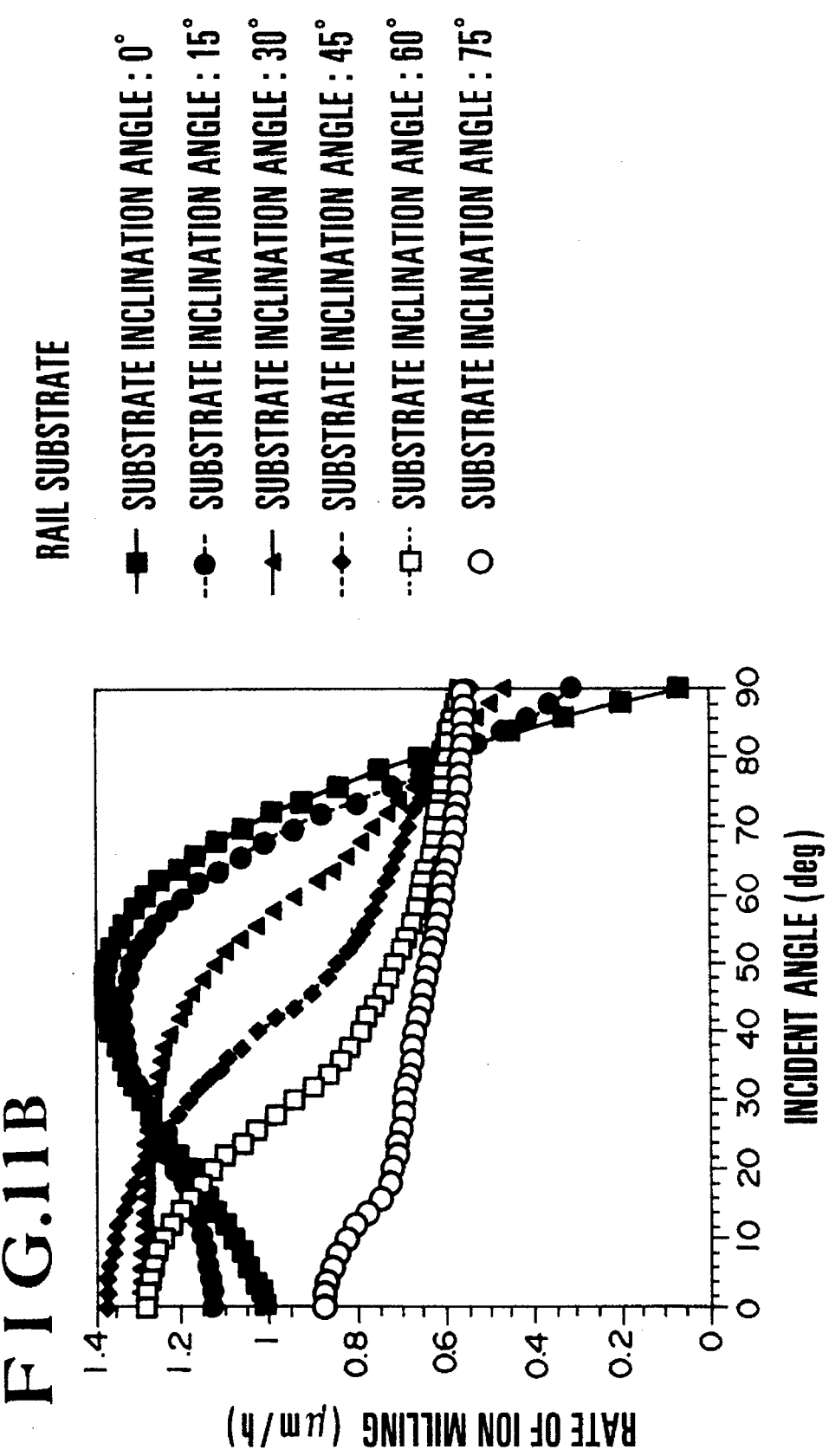

FIG.13A
FIG.13B
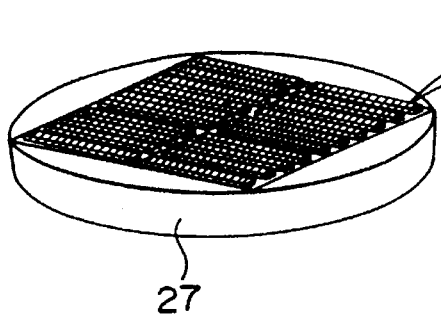
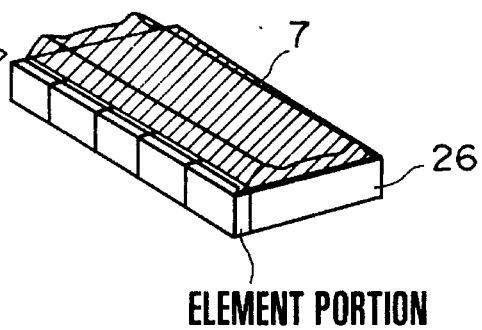
ELEMENT PORTION
FIG.13C
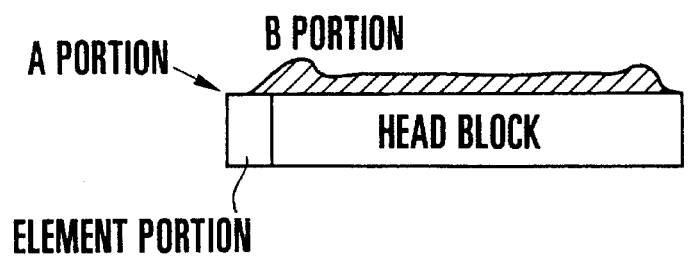
FIG.13D
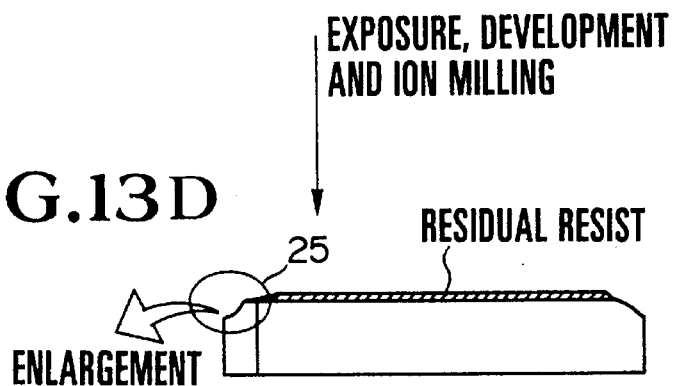
EXPOSURE, DEVELOPMENT AND ION MILLING
FIG.13E
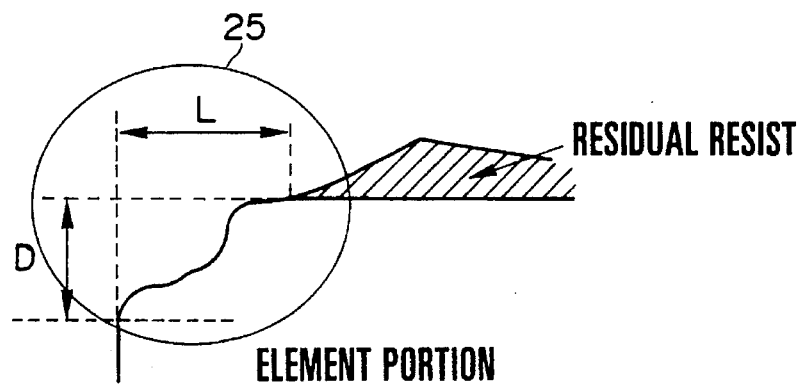

SECTION A

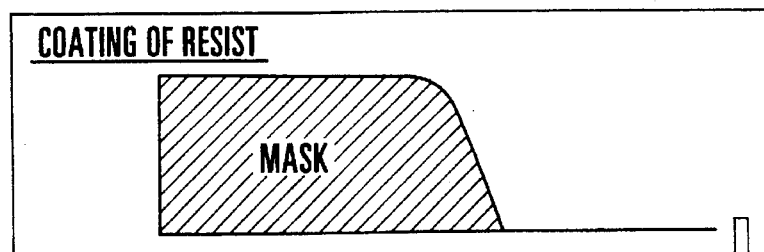
FIG.18A
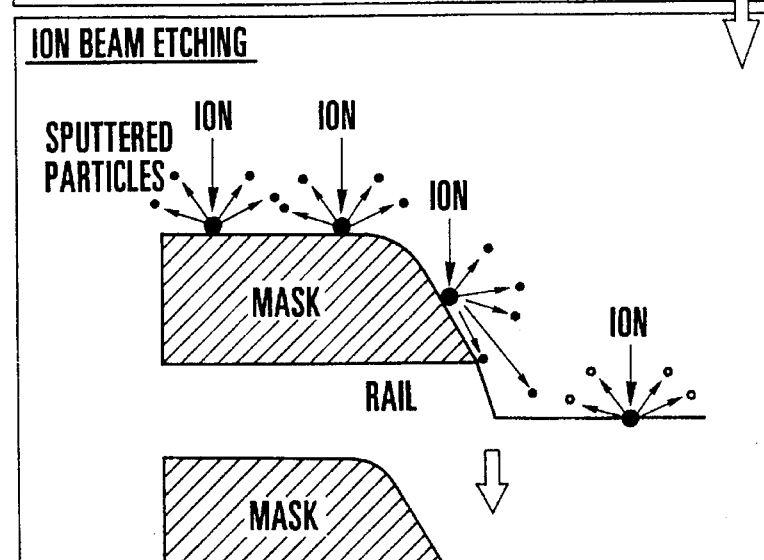
FIG.18B
FIG.18C
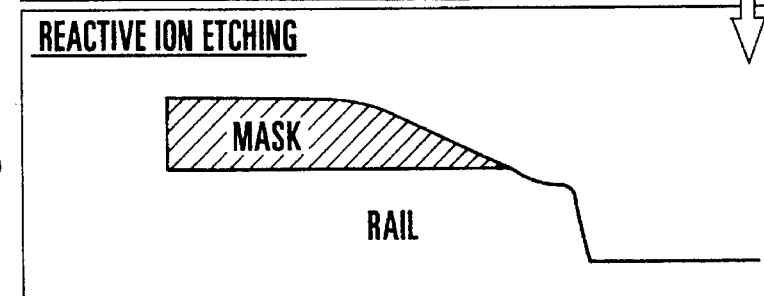
FIG.18D

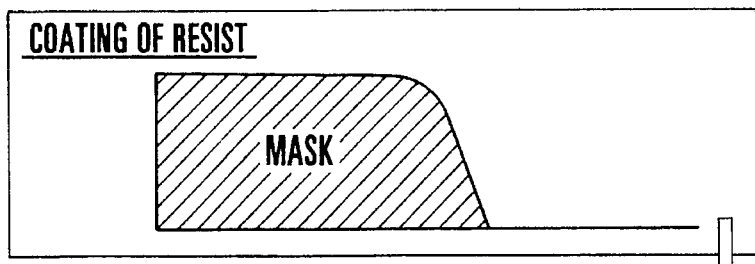
FIG.19A
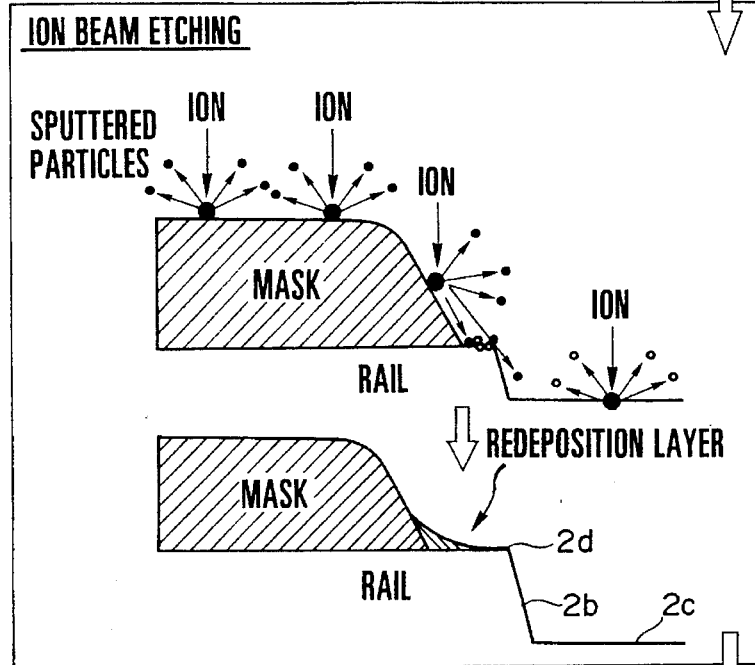
FIG.19B
FIG.19C
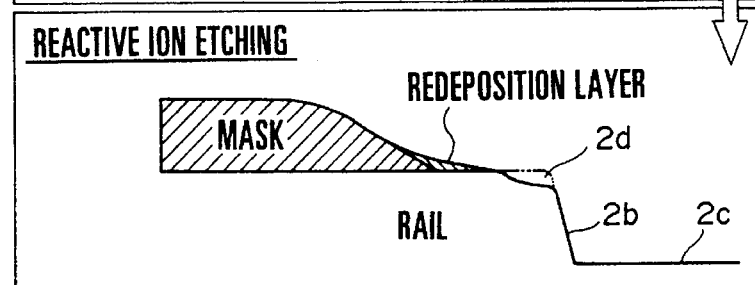
FIG.19D

— ★ — ALUMINA TITANIUM CARBIDE
- - ● - - CARBON

ALUMINA TITANIUM CARBIDE — CARBON

LiNbO₃ — RESIST

PROCESSING BY WHETSTONE

LINEAR RAIL

PROCESSING BY ION MILLING

NON-LINEAR RAIL 5

PROCESSING OF MAGNET HEAD RAIL

TAPERED PORTION
AIR
MOVEMENT

ENLARGEMENT
AIR

THIN FILM MAGNETIC HEAD, PROCESS FOR PRODUCTION THEREOF

BACKGROUND OF THE INVENTION

1. Field of the Invention

The present invention relates to a thin film magnetic head of low flight which gives a small flying height above a disc, as well as to a process for production thereof. More particularly, the present invention relates to a thin film magnetic head in which the width, groove depth and tapered angle of each rail at the surface side of said magnetic head to face a magnetic disc are formed in a desired shape, at a high accuracy and at a high efficiency and which can give a small flying height stably and also can prevent head crush, as well as to a process for production thereof.

The present invention relates also to a plasma etching process using an etching gas. More particularly, the present invention relates to a process for etching using an etching gas, which can process a material of small etching rate (e.g. a ceramic or a high dielectric) in a short time, at a high accuracy, safely and easily.

2. Prior Art

In order to increase the recording density of a thin film magnetic head (hereinafter referred to simply as a magnetic head), it is essential to reduce and stabilize the flying height of magnetic head. For achievement thereof to develop a magnetic head allowing for high-density recording, a particularly important task is to form, on a magnetic head, rail(s) which can minimize the variation in flying height of the magnetic head, caused by the difference in circumferential speed of disc between the inner and outer circumferences of the disc.

Description is made on the formation of rail(s) by referring to FIG. 29 and FIG. 30.

FIGS. 29A and 29B are drawings showing the shapes of magnetic heads and processes for production thereof; FIGS. 30A to 30C are schematic drawings for explaining the flying state of a magnetic head; FIG. 31 is a graph showing the relation between rail width and flying height; and FIG. 32 is a graph showing the relation between rail groove depth and flying height.

In order to allow a magnetic head 1 to fly, there is utilized an air bearing slider preloaded by suspension spring, such as shown in FIG. 30. The air bearing slider is a bearing mechanism consisting of an air layer between a magnetic disc 9 and the top surface of a magnetic head 1 facing the magnetic disc 9, i.e. the top surface of each rail 2 formed on a rail substrate 8 and, as shown in FIG. 30B, is formed by an air which enters said layer from an air inlet 21. When the air, which has entered the layer, leaves the layer from an air outlet 22 at the end of the element portion 20 of the magnetic head 1, the resulting air current caused by viscosity resistance of air between the magnetic head 1 and the magnetic disc 9 imparts a flying force to each rail 2. In this case, the flying height 4 of the magnetic head 1 as shown in FIG. 30C is controlled by said flying force and the pressure of a spring 3 added to the magnetic head 1 from outside. The magnetic head 1 is in physical contact with the magnetic disc 9 when the magnetic disc 9 is in a stopped condition; when the magnetic disc 9 reaches a certain number of rotations, an air bearing as mentioned above is formed, a flying force is generated, and the magnetic head 1 is separated from the magnetic disc 9 and keeps flying at a given flying height 4. With respect to the flying state of the magnetic head 1, its flying height 4 is smaller at the air outlet 22 than at the air inlet 21, as shown in FIG. 30B, and consequently the magnetic head 1 contacts with the magnetic disc 9 more easily at the air outlet 22 when the magnetic disc 9 is in rotation and also in stop.

The shape of the portion of the magnetic head 1 at the air inlet 22 is desirably as smooth as possible to prevent, for example, the damage of the magnetic disc 9 or the element portion 20 of the magnetic head 1. To achieve such a shape efficiently for a large number of magnetic heads 1 is difficult currently. As an approach, there is known a technique of chamfering the portion of a magnetic head 1 at the air outlet 22 by mechanical processing, specifically polishing.

Chamfering of each edge of rail top surface 2a (rail top surface 2a is hereinafter referred to simply as top surface 2a) has been conducted for the purposes of, for example, prevention of rail 2 sticking to magnetic disc 9, acceleration of flow of air onto top surface 2a (top surface 2a is a point of generation of the air dynamic pressure) at the start of flying of magnetic head 1, and prevention of magnetic disc 9 damage caused by the edge of top surface 2a and consequent destruction of recorded information. For this edge chamfering, there are proposed mechanical processing methods, for example, a method of polishing each rail 2 on a lapping sheet-attached rotating disc by allowing the rail 2 to repeat flying and contact with the disc in a state similar to that experienced on a magnetic disc [e.g. Japanese Patent Application Laid-Open No. 60-9656].

The flying height 4 depends upon the number of rotations of magnetic disc 9, the dimension and shape of each rail 2 of magnetic head 1, the pressure of spring 3, etc. This flying height 4 must be minimized and moreover maintained stably in order for a magnetic disc device to allow for high-density recording. It is desirably 100 nm or less. Hence, a strict accuracy is required for the dimension of each rail 2 formed at the air bearing surface, the top surface of a magnetic head 1 which is to contact with a magnetic disc.

The relation between the flying height 4 and the width or groove depth of rail 2 is generally such as shown in FIG. 31 or 32, although it varies slightly depending upon the shape of rail 2. FIG. 31 shows a relation between rail width ($\mu$m) and flying height 4 ($\mu$m) when the rail groove depth ($\mu$m) is constant. It is shown that the flying height 4 is larger when the rail width is larger. FIG. 32 shows a relation between rail groove depth and flying height 4 when the rail width is constant. It is shown that the flying height 4 is minimum when the rail groove depth is at a particular value and that the flying height 4 is larger when the rail groove depth is smaller or larger than the particular value. For example, in a case where the rail has a shape such as the non-linear rail 5 shown in FIG. 29B, the flying height 4 is minimum when the rail groove depth is 5–6 $\mu$m (particular value). In this case, the design value of rail groove depth is set generally at 5–6 $\mu$m. With respect to the geometrical shape of rail 2 top surface, curved line shapes (e.g. a non-linear rail 5) are used practically to obtain a desired flying height 4 in an air bearing mechanism, or to minimize the adverse effects caused by the error in rail 2 formation or the error in formation of rail groove depth, or to minimize the change in flying height 4 by the difference in circumferential speed between the inner and outer circumferences of magnetic disc 9. Examples of other shapes are proposed in Japanese Patent Publication No. 5-8488 and Japanese Patent Application Laid-Open No. 4-276367.

For formation of a rail 2 which has a complicated shape as mentioned above and yet must have a dimension of high accuracy, a dry processing technique, particularly an ion milling technique is in use in place of the conventional mechanical processing using a whetstone as shown in FIG. 29A. The dry processing technique comprises forming a resist pattern matching the shape of a rail 2 to be formed, by photolithography, applying an ion beam 6 using the resist pattern as a mask, as shown in FIG. 29B, to etch a rail substrate 8, and finally removing the mask to form a rail 2.

In the dry processing technique, there is used, as the etching apparatus, an ion milling apparatus. The ion milling apparatus includes the following, for example:

(1) an ion milling apparatus wherein thermoelectrons are generated from a filament, a troidal movement is imparted to the thermoelectrons by an external magnetic field, an active gas is efficiently ionized by their troidal movement and thereby a plasma is generated, an active ion (an ion beam) is extracted from the plasma by an electrode, and processing (ion milling) is conducted with the ion beam;

(2) an ion milling apparatus having an ECR (electron cyclotron resonance) ion source as shown in FIG. 5, wherein a microwave is generated by a microwave generator, electron cyclotron resonance is allowed to take place by the microwave and an external magnetic field, thereby an active gas is ionized efficiently to form a plasma, an active ion is extracted from the plasma by an electrode, and processing (ion milling) is conducted with the ion beam.

In processing a material by etching to form a fine pattern therein, processing by reactive ion etching (hereinafter referred to as RIE) or by ion milling has hitherto been carried out using, as the etching gas, Ar or a fluorine-containing compound gas such as $CF_4$, $CHF_3$ or the like.

In such processing, however, the ratio of the processing rate of material to be processed to the processing rate of mask, i.e., the selectivity is as low as about 1.3. Consequently, a thick mask was required and, when the amount of processing was large as in the case of forming a rail groove of a magnetic head by the use of a carbon film as a mask, at least 10 and odd hours were required for the formation of said carbon film, allowing the whole process to need a long time.

Further, when a thick mask was used, the mask caused a change in width during processing, which allowed the processed material to have a large dimensional shift and a large dimensional scatter and resultantly gave a low processing accuracy. Meanwhile, in the formation of a semiconductor or an optical element, the pattern width is very small although the processing amount is small. As a result, the dimensional shift of the mask used has a large influence on the processing accuracy. In order to solve these problems, it was important to use a mask material and a gas both capable of giving a selectivity as large as possible.

For the above reasons, various masks and gases to be used were studied, and $CH_4$ (methane) gas or $CH_2F_2$ (difluoromethane) gas has been used conventionally. It is known that, when these gases are used, a deposit appears on a mask such as carbon film, silicon film, resist, metal film or the like during etching and the selectivity becomes infinite.

When a conventional polishing technique is actually used to allow a magnetic head 1 to have a particular shape at the air outlet 22 by chamfering, it is currently difficult to conduct the chamfering efficiently because the refuse generated by polishing must be disposed and the element portion of the magnetic head may be deteriorated by the polishing solution used. In the case of, in particular, a magnetic head 1 having a protective film of very small thickness (5–30 nm) (not shown in the drawings) on the rail top surface for higher reliability, chamfering without damaging said protective film is extremely difficult because the protective film is too thin.

When mechanical polishing is used to conduct the chamfering of each edge of rail top surface 2a, it is difficult to achieve the chamfering uniformly for a large number of magnetic heads 1. This has been a problem for obtaining a magnetic head 1 capable of stably giving a low flying height.

Next, description is made on the mechanism of the above-mentioned conventional dry processing and the drawbacks thereof, by referring to FIGS. 33 to 37.

FIG. 33 is a drawing explaining the formation of a rail by ion milling using a patterned mask 7 made of a photoresist or the like; FIG. 34 is a graph showing the angular dependences of ion milling rates; FIG. 35 is a drawing showing the change with time, of the sectional shape of a rail during rail formation; FIG. 36 is a graph showing the relation between rail groove depth and rail width; and FIG. 37 is a drawing showing a redeposition layer formed on each side of a rail.

In FIG. 33, a mask 7 is etched by an ion beam 6 and, simultaneously therewith, a rail substrate 8 is etched, whereby a rail 2 is formed. In this case, the etching rates of the mask 7 and the rail substrate 8 are both determined mainly by the angular dependences of ion milling rates shown in FIG. 34. That is, as shown in FIG. 34, the ion milling rates of both the mask 7 and the rail substrate 8 increase gradually while the ion beam incident angle changes from 0° to 40°, reach respective peaks between 40° and 60°, and thereafter decrease sharply. For instance, the top surface of the mask 7 is processed at an ion milling rate when the ion beam incident angle is 0° and the sides of the mask 7 are processed at an ion milling rate when the ion beam incident angle is about equal to a mask tapered angle β shown in FIG. 33. Similarly, the rail substrate 8 which is to become the bottom of the rail 2 is processed at an ion milling rate when the ion beam incident angle is 0°, and the sides of the rail 2 are processed at an ion milling rate when the ion beam incident angle is equal to a rail tapered angle α. Practice of ion milling, however, teaches that the processing rate is not determined only by the angular dependence of ion milling rate.

The phenomenon of ion milling is complex because it includes not only the above-mentioned milling action per se but also a phenomenon that the particles 12 sputtered by the ion beam 6 do not leave the material to be processed and redeposit on the sides or bottom of the material, i.e. a redeposition phenomenon. While it is known that the redeposition of the sputtered particles 12 takes place because a certain proportion of the sputtered particles 12 are redeposited, it is very difficult to know the proportion quantitatively. This is why the ion milling phenomenon is complex.

FIG. 35 is a drawing showing the change with time, of rail sectional shape in ion milling. Anticipation of a final rail sectional shape 16, i.e., formation of a desired sectional shape at high reproducibility is currently very difficult even when the angular dependence of ion milling rate as shown in FIG. 34 is known beforehand, because there arise, for example, a phenomenon that the sectional shape of mask 7 (particularly, the mask tapered angle β) and the rail tapered angle α change with time, a phenomenon of redeposition of sputtered particles 21, a variation in the manner of change of original mask 7 shape into its final shape, and a variation in ion milling conditions.

FIG. 36 is a graph showing the relation between rail groove depth and rail width when a rail 2 is formed using a conventional ion milling technique. As shown in FIG. 36, the rail width is smaller when the rail groove depth is larger, because the sides of the rail 2 are processed more. Currently, however, it is difficult to control the rail width at a desired accuracy, because there is currently no reliable technique by which the completion timing of processing is indicated when the rail groove depth has reached a certain value. Further, as is appreciated from FIG. 36, deviation of the rail groove depth from a desired value by 1 μm results in deviation of the rail width by about 6 μm. Because of this matter, it often occurs that the width of the rail formed deviates from the design value range even when the rail groove depth is processed in a desired range. This is one reason for low rail processing accuracy, low productivity of magnetic head 1, low stability of flying characteristic of magnetic head, etc.

In forming a rail 2 by ion milling, there is, besides the above-mentioned dimensional (e.g., rail width) accuracy problem, a further problem that a redeposition layer 10 remains until the end of processing in some cases, as shown in the processing model of FIG. 33. Since this redeposition layer 10 is formed by deposition of sputtered rail substrate material, it cannot be removed by the use of an organic solvent, oxygen plasma ashing or the like and remains until the end of processing, for example, in a state as shown in FIG. 37, with the projected front end of the redeposition layer 10 protruding from the rail surface. This results in damage of magnetic disc 9 by the front end of redeposition layer 10 when the magnetic disc device is in operation and, in the worst case, results in destruction of recorded information.

The $CH_4$ or $CH_2F_2$ gas used in the conventional processing of various materials to form a fine pattern, is a combustible gas and dangerous. Hence, a large expenditure is necessary to implement safety measure for piping, etc. and the application of such a gas in a large-scale facility was difficult.

Further, the deposition film formed on a mask during etching has a large thickness and the thickness varies greatly. Therefore, the variation in dimensional shift after processing was large. Particularly in formation of fine groove for semiconductor or optical element, the mask thickness increases with the progress of processing; consequently the processing is conducted at high aspect ratios; the processed material redeposits on the sides of mask and groove; the sectional shape after processing becomes a triangle or a trapezoid; as a result, no desired sectional shape could be obtained.

SUMMARY OF THE INVENTION

In view of the above-mentioned problems of the prior art, the present invention provides a thin film magnetic head in which the width, groove depth and tapered angle of each rail at the top surface of said magnetic head to face a magnetic disc are formed in a desired shape, at a high accuracy and at a high efficiency and which can give a small flying height stably and also can prevent head crush. The invention also includes a process for producing such a head.

In the first object, there are provided a rail shape in magnetic head, which is small in variation of flying height even when there are, during the formation of said rail, variations in mask film thickness, mask tapered angle, ion milling selectivity, etc. and which is also small in variation of rail width as compared with the variation of rail groove depth (the variation of rail width is not substantially affected by the formation of redeposition layer), as well as a process for formation of such a rail. Specifically, there are provided a rail shape which has a high rail width accuracy, i.e., a rail width variation of 3 μm/μm or less when the rail groove depth is formed in a variation of 1 μm, as well as a process for formation of such a rail.

In the second object, there is provided a process for production of a magnetic head, wherein in the formation of the above rail, the air outlet end of magnetic head can be chamfered.

In the third object, there is provided a process for production of a magnetic head, wherein the lengthwise edge of rail top surface can be processed uniformly, accurately and efficiently.

Another object of the present invention is to provide a process for etching using an etching gas, which can process a material of small etching rate (e.g. a ceramic or a high dielectric) in a short time, at a high accuracy, safely and easily. Still other object of the present invention is to obtain, by using the above etching process, a thin film magnetic head, a semiconductor memory, an optical element, etc. each of high accuracy.

SUMMARY OF THE INVENTION

The present inventors made a study on the processing conditions to be employed in the formation of magnetic head rail(s), such as kind and concentration of ion milling gas, mask film thickness m, mask tapered angle β, substrate inclination angle (θ shown in FIG. 5), substrate rotation and the like. As a result, it was found that the drawbacks of the prior art can be solved by determining the processing conditions, particularly, the kind of ion milling gas and the substrate inclination angle θ in ion milling so that the rail tapered angle α becomes 55°–85°, preferably 60°–80°. Specifically, it was found that high-accuracy processing is made possible and the variation in flying height of magnetic head as compared with various processing variations can be made small by using, as the ion milling gas, a fluorinated hydrocarbon gas, particularly tetrafluoroethane ($CH_2FCF_3$) at a particular concentration, or, when there is used an ion milling gas other than the above-mentioned gas, such as Ar or the like, by carrying out ion milling with the substrate inclination angle β being kept at 15°–60° and with the substrate being rotated. The finding has led to the completion of the present invention.

It was further found that by using the abovementioned ion milling technique and by conducting roll coating for mask formation, the chamfering of the rail at the air outlet end can be conducted simultaneously.

Further, in order to solve the above-mentioned problems, chamfering is conducted by forming, on the surface of a substrate on which rail(s) is (are) to be formed, a two-dimensional mask pattern matching said rail(s) to be formed, conducting dry etching (e.g., ion beam etching) to form rail(s), conducting reactive ion etching to allow the sides of the mask to regress from the edges of the rail top surface, and simultaneously subjecting each rail portion exposed by the regression, to etching.

When it is necessary to control the edge sectional shape for the achievement of a desired flying characteristic, it is conducted to form, by utilizing the redeposition phenomenon in ion beam etching, a thin redeposition layer between each mask side and each rail portion exposed by the regression of each mask side and thereby changing the amount of regression of each mask side during reactive ion etching. The conditions under which said redeposition layer can be formed, are such that the thickness of photoresist mask is smaller than 7 μm, the selectivity in ion beam etching is 4.0 or larger and the tapered angle of each mask is smaller than 80°.

To achieve the above objects, the first invention relating to a process for etching using an etching gas is a process for etching using an etching gas, wherein a material to be processed is etched with an etching gas via a mask by ion milling or reactive ion etching, which process is characterized by using, as the mask, any of a carbon film, a silicon film, a metal film, a resist and a high-molecular material and also using, as the etching gas, $CH_2FCF_3$ (tetrafluoroethane) gas.

The second invention relating to a process for etching using an etching gas is a process for etching using an etching gas, wherein a material to be processed is etched with an etching gas via a mask by ion milling or reactive ion etching, which process is characterized by using, as the mask, any of a carbon film, a silicon film, a metal film, a resist and a high-molecular material and also using, as the etching gas, a mixed gas of $CH_2FCF_3$ and Ar.

The third invention relating to a process for etching using an etching gas is a process for etching using an etching gas, wherein a material to be processed is etched with an etching gas via a mask by ion milling or reactive ion etching, which process is characterized by using, as the mask, any of a carbon film, a silicon film, a metal film, a resist and a high-molecular material and also using, as the etching gas, a mixed gas of $CH_2FCF_3$ and $SF_6$.

The fourth invention relating to a process for etching using an etching gas is a process for etching using an etching gas, wherein a material to be processed is etched with an etching gas via a mask by ion milling or reactive ion etching, which process is characterized by using, as the mask, any of a carbon film, a silicon film, a metal film, a resist and a high-molecular material and also using, as the etching gas, a mixed gas of $CH_2FCF_3$ and $CHF_3$.

The fifth invention relating to a process for etching using an etching gas is a process for etching using an etching gas, wherein a material to be processed is etched with an etching gas via a mask by ion milling or reactive ion etching, which process is characterized by using, as the mask, any of a carbon film, a silicon film, a metal film, a resist and a high-molecular material and also using, as the etching gas, a mixed gas of $CH_2FCF_3$ and $CF_4$.

The sixth invention relating to a process for etching using an etching gas is a process for formation of the rail(s) of a thin film magnetic head, which is characterized by using a ceramic substrate as the material to be processed.

Particularly, the sixth invention is a process for formation of the rail(s) of a thin film magnetic head, which is characterized by using, as the material to be processed, alumina titanium carbide, alumina or zirconia.

More particularly, the sixth invention is a process for formation of the rail(s) of a thin film magnetic head, which is characterized in that the rail(s) is (are) formed so that the flying height of the magnetic head becomes 0.15 μm or smaller.

To achieve the above-mentioned objects, the seventh invention relating to a process for etching using an etching gas is a process for formation of a magnetic element, which is characterized by using alumina as the material to be processed.

To achieve the above-mentioned objects, the eighth invention relating to a process for etching using an etching gas is a process for formation of an optical element, which is characterized by using optical crystals or a glass substrate as the material to be processed.

To achieve the above-mentioned objects, the ninth invention relating to a process for etching using an etching gas is a process for formation of a semiconductor element, which is characterized by using a high dielectric as the material to be processed.

To achieve the above-mentioned objects, the tenth invention relating to a process for etching using an etching gas is a process for formation of a semiconductor element, which is characterized by using lead zirconate titanate [$Pb(Zr_x, Ti_{1-x})O_3$], $BaSrTiO_3$ or $SrTiO_3$ as the material to be processed.

To achieve the above-mentioned objects, the eleventh invention relating to a process for etching using an etching gas is a process for formation of a semiconductor element, which is characterized by using a metal as the material to be processed, to form a metal wiring layer.

Particularly, the eleventh invention is a process for formation of a semiconductor element, which is characterized by using Cu or Pt as the material to be processed, to form a metal wiring layer.

By determining the shape of rail(s) and the conditions for formation of rail(s) so that the tapered angle of each rail formed becomes 55°–85°, there can be formed magnetic head rail(s) which has (have) no residual deposition layer and whose width(s) is (are) within the allowable design value range even when each rail groove depth is slightly too large or slightly too small; thereby, there can be produced a magnetic head which gives a stable flying height and which gives little head or disc damage in rotation or stop of magnetic disc.

In the above technique, by using roll coating for mask formation, there can be conducted chamfering of magnetic head at the air outlet end during the ion milling for formation of magnetic head rail(s); that is, there can be easily conducted processing by which the destruction of magnetic head and magnetic disc caused by their contact during flight or stop of magnetic head can be prevented.

Since a mask is formed uniformly on the surface of each portion of substrate to become a rail, the mask can regress uniformly by RIE, making it possible to obtain a uniform top surface of rail even in mass production of the magnetic head.

The sectional shape of each lengthwise edge of the top surface of each rail formed is determined by the regression amount of the resist used and the etching rate of the rail substrate used.

The regression amount of each side of resist during RIE is determined by the distribution of resist thickness at or around the resist side, and the distribution of resist thickness at or around the resist side depends upon the tapered angle of the cross section of the mask at the resist side after ion beam etching.

This tapered angle of each resist can be controlled by the etching characteristic of resist which is influenced by the incident angle of the ion beam. The regression amount of each resist side can be varied by forming, on the resist side which has regressed, a thin resist layer of small inclination angle, i.e. a redeposition layer by the redeposition of sputtered resist. This redeposition layer is formed more easily as the mask (resist) film thickness is smaller, the tapered angle of mask is smaller and the selectivity in ion milling is larger.

The mask film thickness, when the mask is a photoresist mask, is determined by the times of coating of resist or the viscosity of resist coated. The tapered angle of mask is determined by the defocussing at the time of irradiation with light. The selectivity can be increased by, when a mixed gas of $C_2H_2F_4$ and Ar is used as an ion source gas in ion beam etching, increasing the flow rate of $C_2H_2F_4$. The redeposition layer can be formed by setting the initial mask thickness at a value smaller than 7 μm, the selectivity in ion beam etching at 4.0 or larger, and the tapered angle of initial resist mask at a value smaller than 80°.

By the above-mentioned formation of a thin redepositon layer, the regression of each resist side during RIE is fast at the redeposition layer portion of resist side because the redeposition layer is thin, and is slow at the other portion having no redeposition layer. As a result, each edge of rail top surface subjected to the same ion beam etching is formed so as to have two steps with different tapered angles.

In the above processing using an etching gas, when $C_2H_2F_4$ alone is used as an etching gas, a very thin deposit is formed on a carbon film, a silicon film, a metal film (e.g. a chromium film) or a high-molecular substance film during etching and the selectivity becomes infinite. Consequently, by using a very thin mask, a deep groove can be formed by ion milling and RIE.

Since there is little shift in mask dimension, there is little shift in dimension of material to be processed, whereby high processing accuracies are obtained. The rate of deposit formation on mask is small as compared with when using a conventional gas, whereby the deterioration of dimensional accuracy can be reduced.

Further, $C_2H_2F_4$, being incombustible and having no undesirable properties such as toxicity, corrosiveness and the like, is easy to handle and can be easily used in conventional apparatuses or production facilities.

A very large selectivity can be obtained also when a mixed gas of $C_2H_2F_4$ and Ar is used as an etching gas. In the production of a magnetic head or a semiconductor element, removal of mask is generally conducted after processing; in that case, when a deposit is present on the mask, an additional step of removal of said deposit must be carried out; however, when there is used a mixed gas of $C_2H_2F_4$ and at least 24% of Ar, no deposit is formed and the mask is processed by a small amount, making unnecessary the step of deposit removal after processing.

A very large selectivity can be obtained also when a mixed gas of $C_2H_2F_4$ and $SF_6$ is used as an etching gas. Since $SF_6$ is highly reactive, a mixed gas thereof can process a material at a higher rate and in a shorter time. Moreover, the mixed gas can suppress the formation of deposit on mask, making unnecessary the step of deposit removal after processing similarly to the abovementioned case of using a mixed gas of $C_2H_2F_4$ and Ar.

Thus, the use of the above technique makes it possible to increase the accuracy in production of magnetic head, optical element, semiconductor memory, etc.

In the above processing technique, a material to be processed (e.g. a ceramic substrate) gives a small dimensional shift, making it possible to form magnetic head rail(s) of high dimensional accuracy. As a result, there can be mass-produced a magnetic head which can give a flying amount of 0.15 μm or smaller stably.

BRIEF DESCRIPTION OF THE DRAWINGS

FIGS. 10A–10B are graphs showing the angular dependences of the ion milling rates of mask and rail substrate when Ar was used as an ion milling gas.

FIGS. 11A–11B are graphs showing the angular dependences of the ion milling rates of mask and rail substrate when a mixed gas of Ar and $C_2H_2F_4$ was used as an ion milling gas.

FIGS. 13A–13E are drawings showing the shape of the resist coated in FIG. 12 and a process of chamfering.

FIGS. 18A–18D are drawings explaining a process for rail formation.

FIGS. 19A–19D are drawings explaining a process for rail formation.

DETAILED DESCRIPTION

The first Example of the present invention is described below by referring to FIGS. 2–11.

Figure 2:
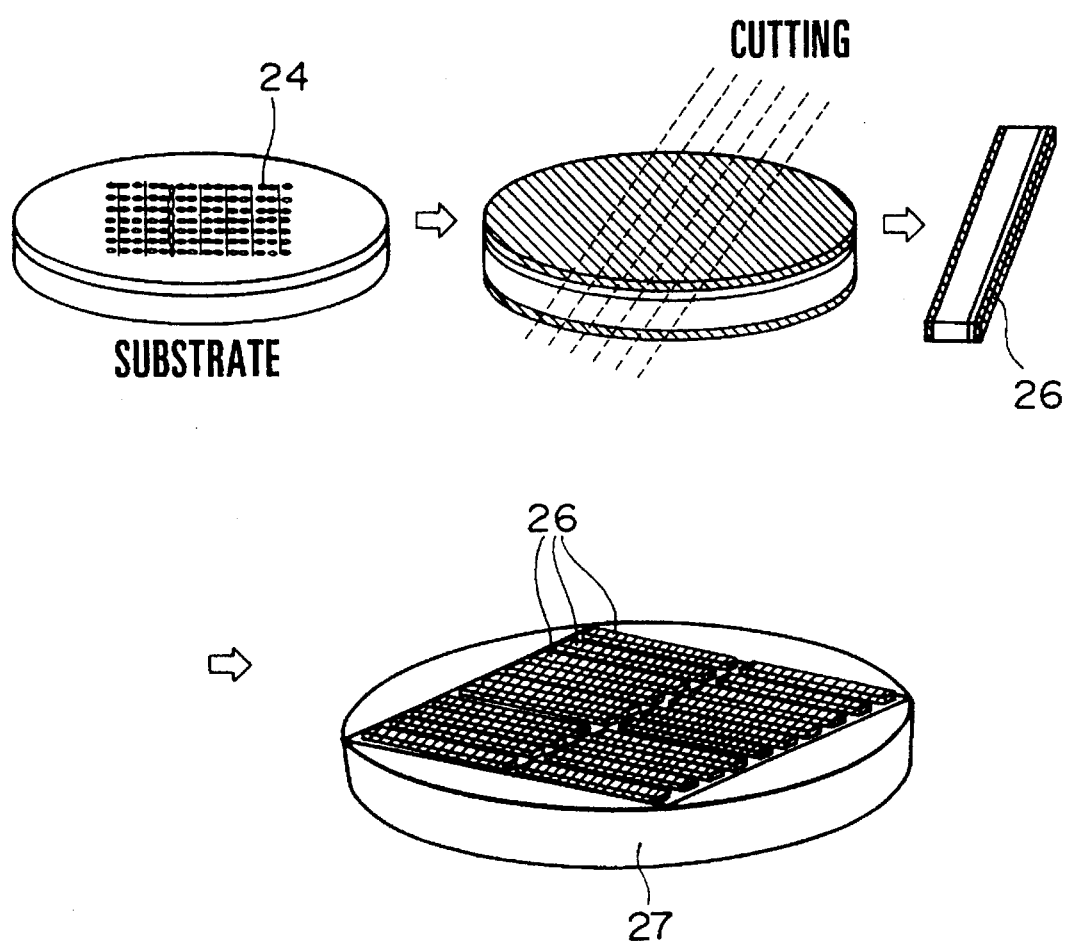
FIG. 2 is a drawing showing a process for formation of rails.
Figure 3:
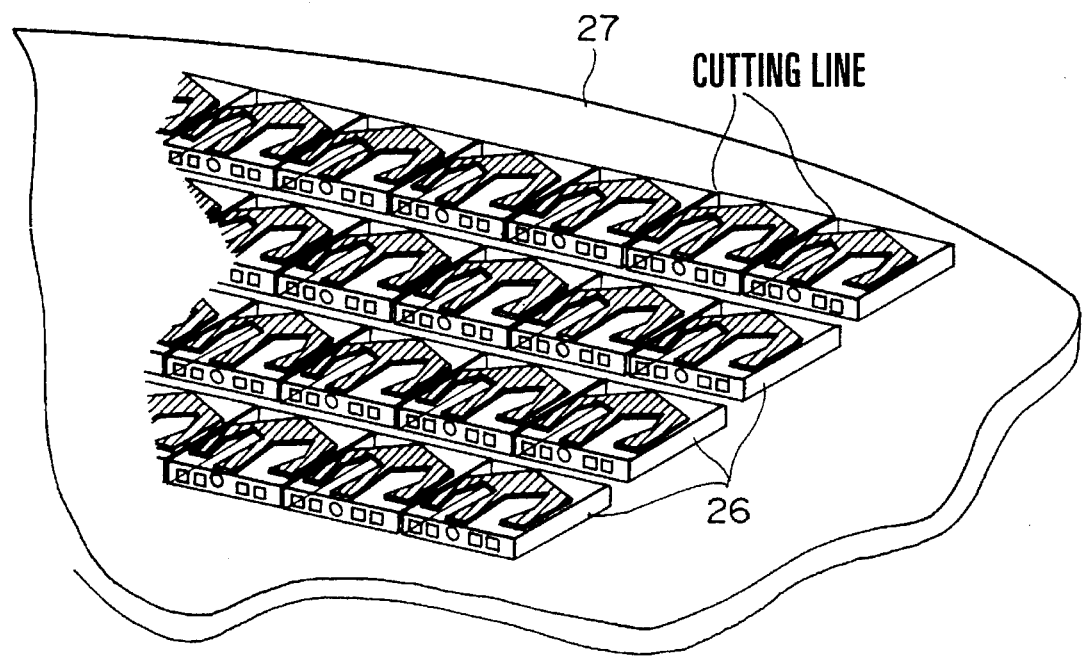
FIG. 3 is a fragmentary perspective view of head blocks after ion milling, mounted on a fixation zig.
Figure 4:
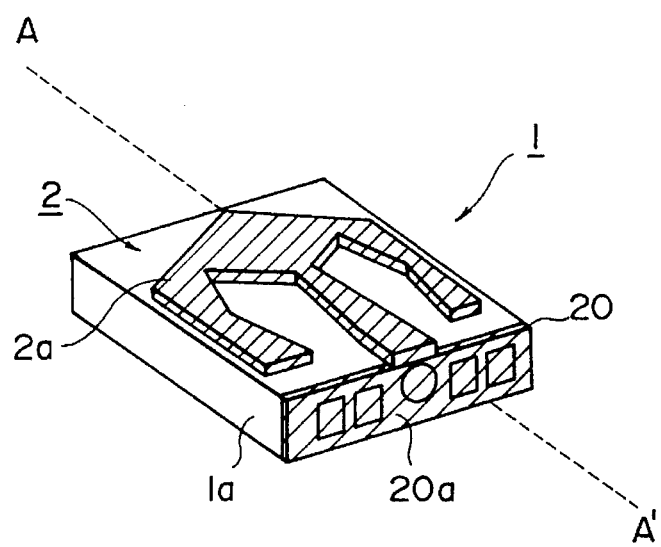
FIG. 4 is a perspective view of a single magnetic head of the head blocks shown in FIG. 3.
Figure 5:
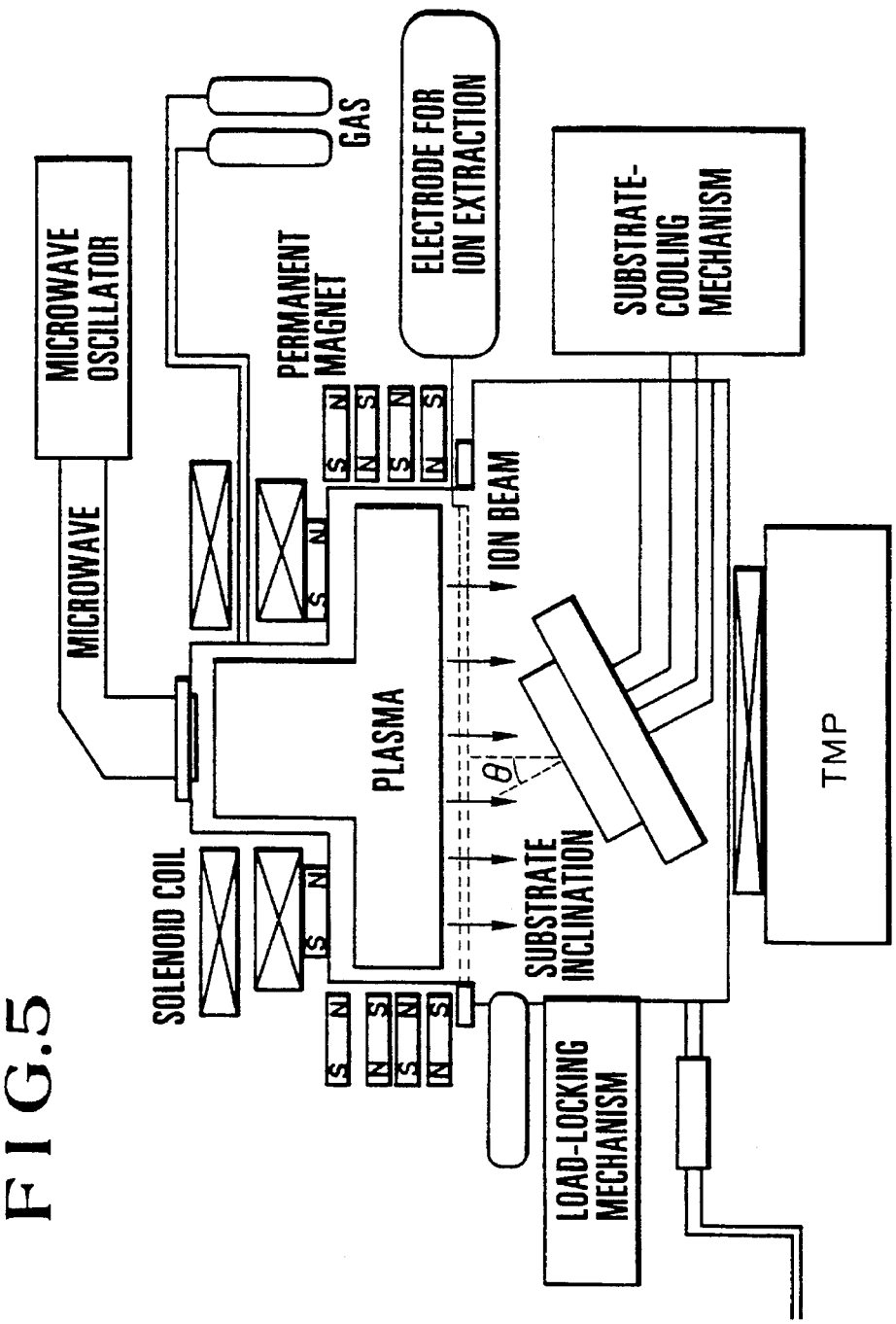
FIG. 5 is a drawing showing the constitution of a known ion milling apparatus.
Figure 6:
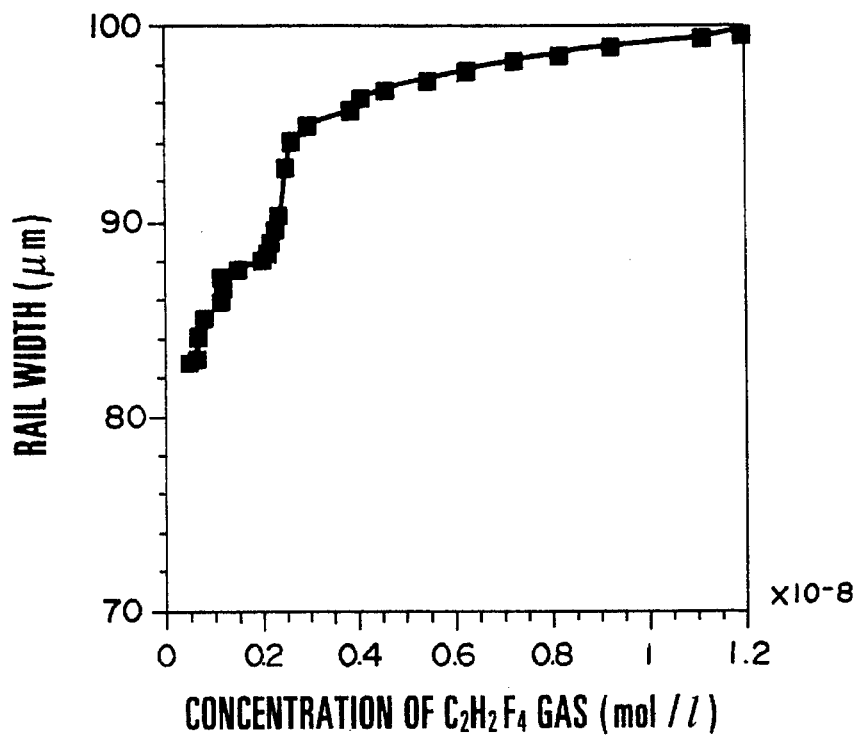
FIG. 6 is a graph showing the relation between concentration of $C_2H_2F_4$ gas and rail width.
Figure 7:
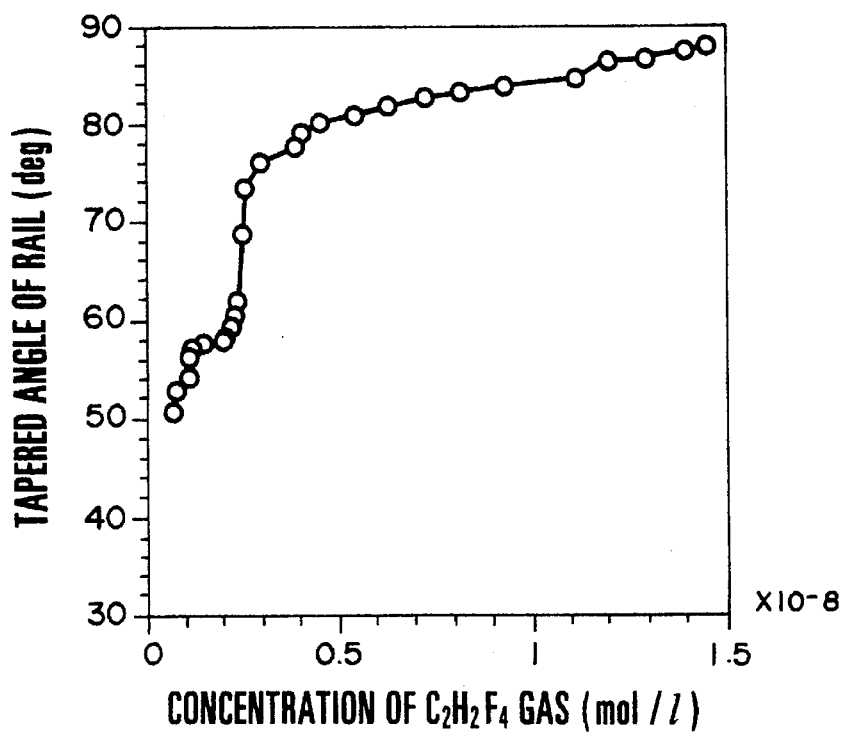
FIG. 7 is a graph showing the relation between concentration of $C_2H_2F_4$ gas and tapered angle of rail.
Figure 8:
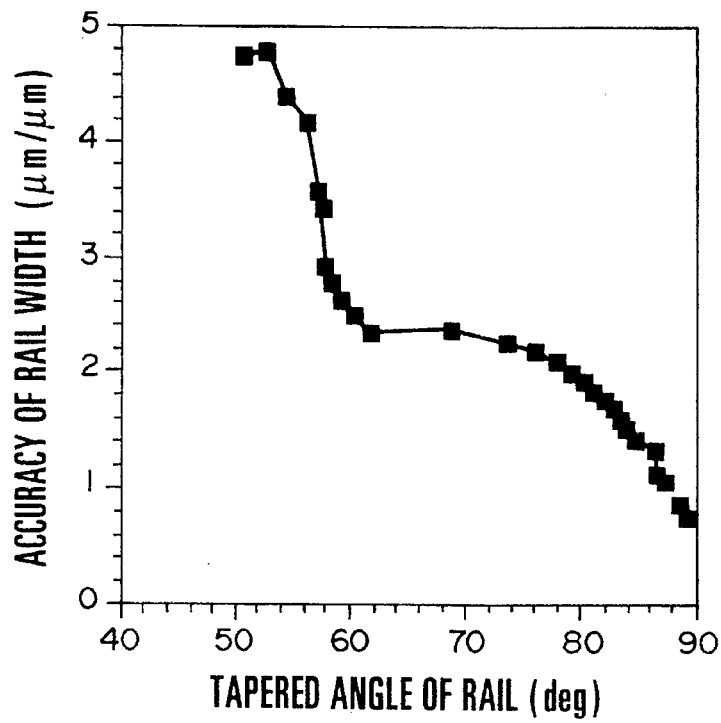
FIG. 8 is a graph showing the relation between tapered angle of rail and accuracy of rail width.
Figure 9:
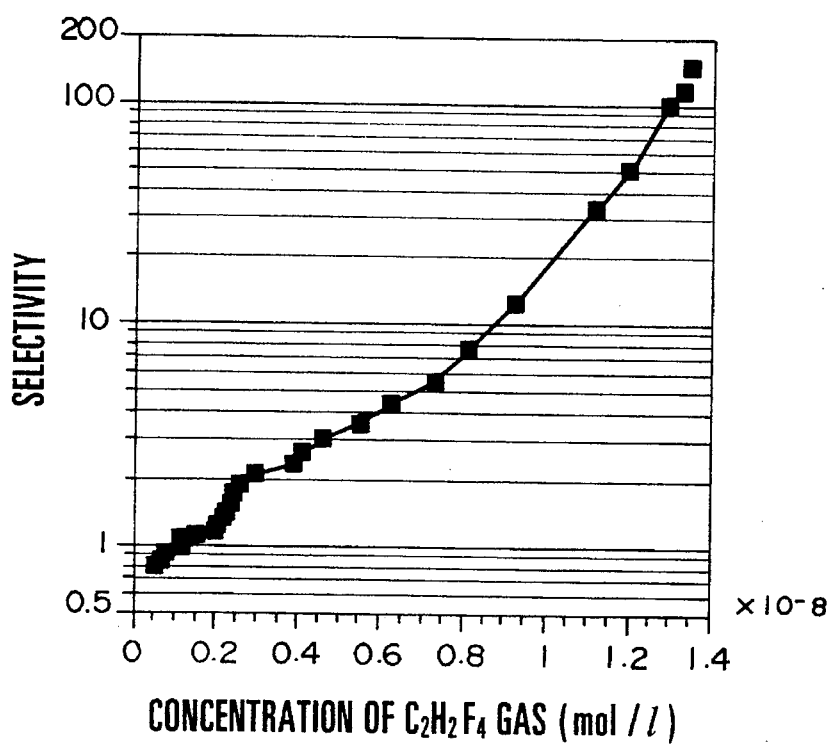
FIG. 9 is a graph showing the relation between concentration of $C_2H_2F_4$ gas and selectivity.
Figure 10A:
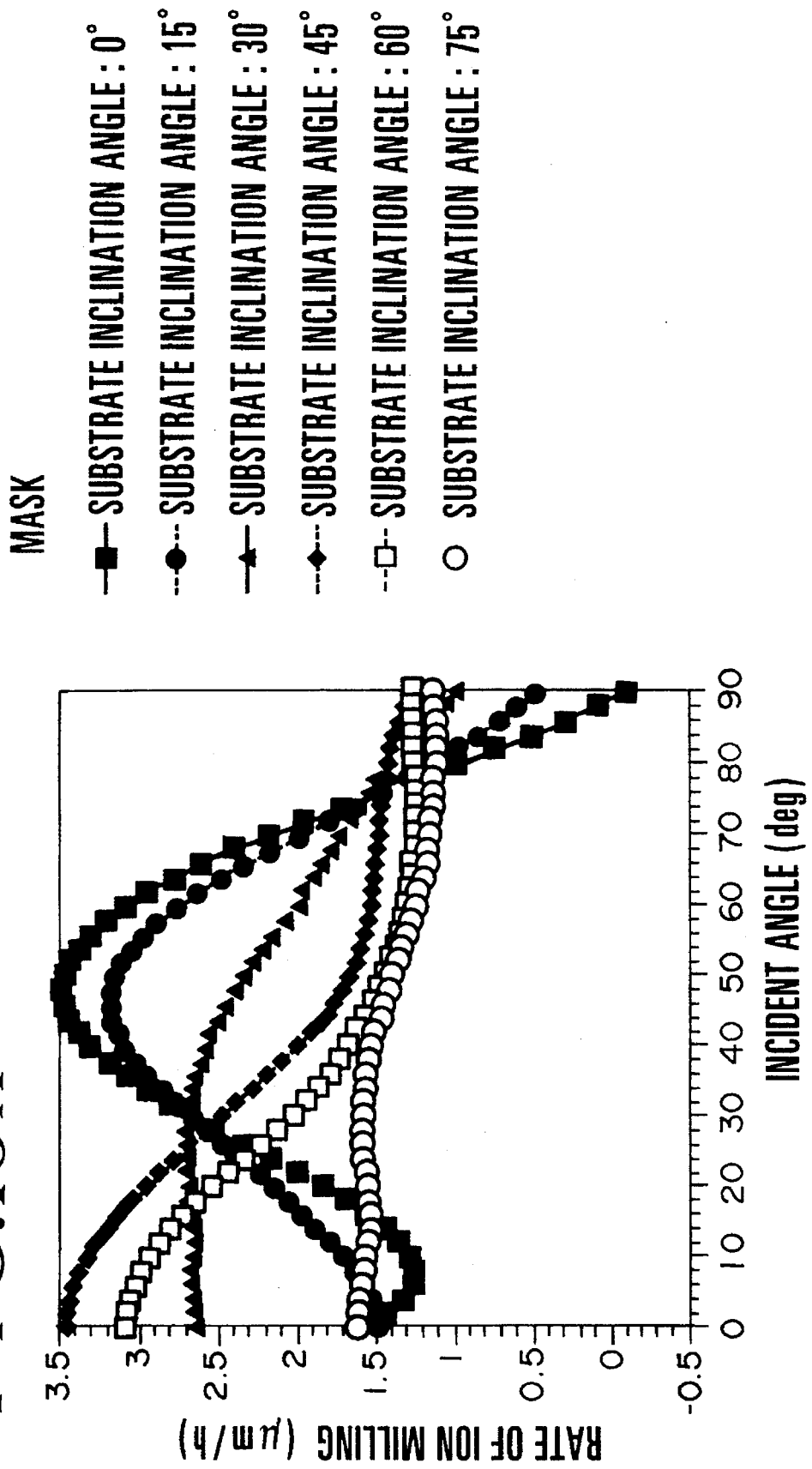
Figure 11A:
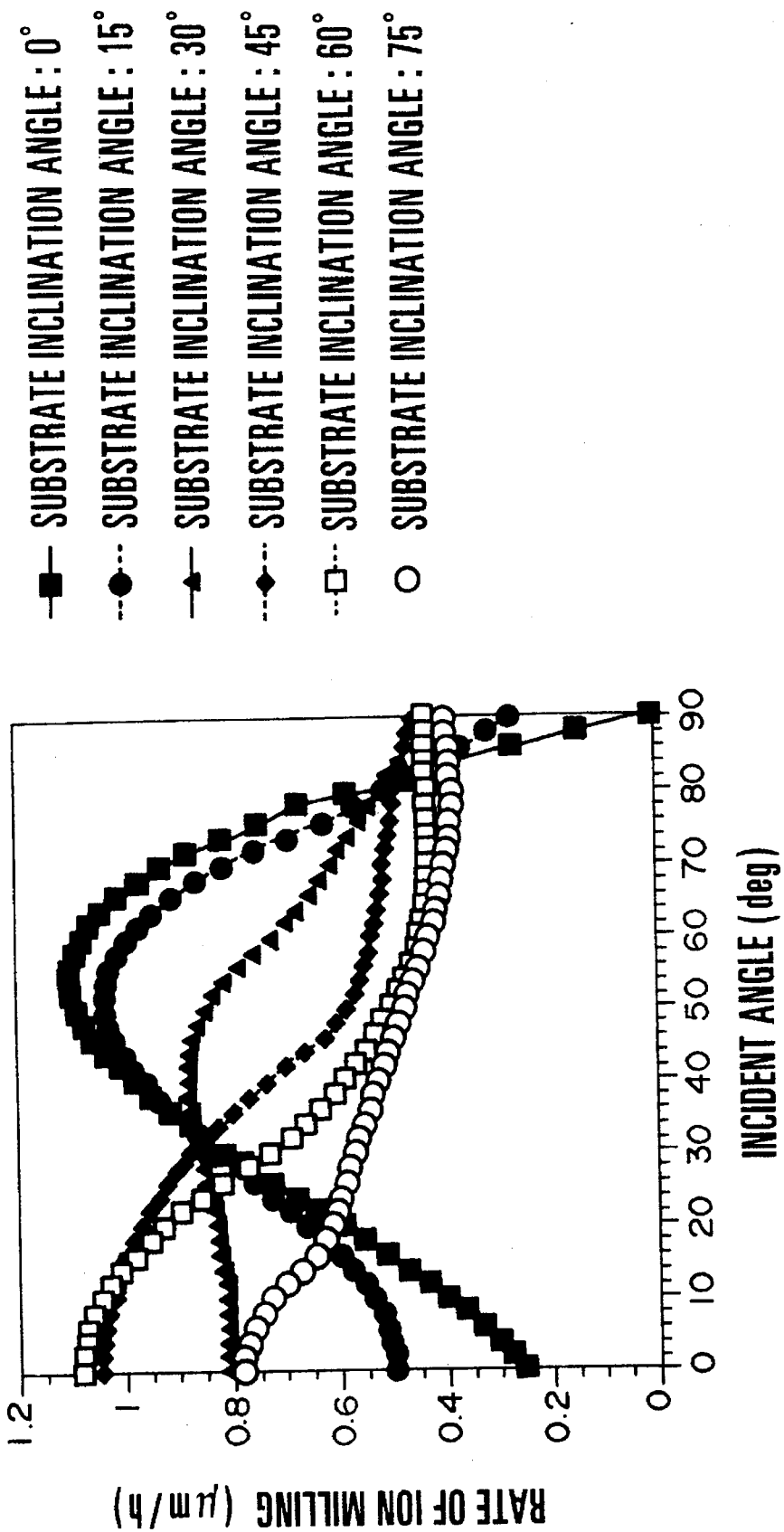

FIG. 2 is a drawing showing a process for formation of rails; FIG. 3 is a fragmentary perspective view of head blocks after ion milling, mounted on a fixation zig; FIG. 4 is a perspective view of a single magnetic head of the head blocks shown in FIG. 3; FIG. 5 is a drawing showing the constitution of a known ion milling apparatus; FIG. 6 is a graph showing the relation between concentration of $CH_2FCF_3$ gas and rail width; FIG. 7 is a graph showing the relation between concentration of $CH_2FCF_3$ gas and tapered angle of rail; FIG. 8 is a graph showing the relation between tapered angle of rail and accuracy of rail width; FIG. 9 is a graph showing the relation between concentration of $CH_2FCF_3$ gas and selectivity; FIG. 10A and 10B are graphs showing the angular dependences of the ion milling rates of mask and rail substrate when Ar was used as an ion milling gas; and FIGS. 11A and 11B are graphs showing the angular dependences of the ion milling rates of mask and rail substrate when a mixed gas of Ar and $CH_2FCF_3$ was used as an ion milling gas.

The first Example is an ion milling process wherein a substrate to be processed (a rail substrate) is placed in an ion milling apparatus shown in FIG. 5 with the inclination angle θ of the substrate (hereinafter referred to as substrate inclination angle θ) maintained at 0° (that is, an ion beam hits the rail substrate perpendicularly thereto and, in this state, ion milling is conducted.

As shown in FIG. 2, a plurality of elements 24 are formed on a rail substrate, and the resulting substrate is cut into desired dimensions to form a plurality of head blocks 26. These head blocks 26 are arranged on a fixation zig 27 and then a mask is formed thereon by photolithography. The resulting zig is placed in an ion milling apparatus shown in FIG. 5 and ion milling is conducted to form rail(s) on each magnetic head. FIG. 3 shows a perspective view of head blocks after ion milling, and FIG. 4 shows a single magnetic head.

Next, the ion milling technique of the present invention is described in detail.

One requirement in the present ion milling technique is to use a fluorinated hydrocarbon gas, particularly tetrafluoroethane ($C_2H_2F_4$) as the ion milling gas. $C_2H_2F_4$ is an incombustible gas having a boiling point of –26.2° C. and is known as a refrigerant gas which causes no depletion of ozone layer.

In the present invention, mere use of said gas is not sufficient and said gas is used in an appropriate concentration range. The appropriate concentration range is $0.2$–$1.2 \times 10^{-8}$ mol/l in the case of $C_2H_2F_4$. This is required because when the concentration is smaller than the lower limit of the range, the tapered angle of rail becomes smaller than 55° and the accuracy of rail width is deteriorated and, when the concentration is larger then the upper limit of the range, a redeposition layer 10 remains on each rail formed although the accuracy of rail width is good. This point is explained below by showing some specific data.

In the ion milling apparatus shown in FIG. 5, a positive ion is extracted from a plasma ion source via an electrode for ion extraction; the extracted positive ion is applied onto a material to be processed; thereby, ion milling is conducted. In this apparatus, there were studied the relations between concentration of $C_2H_2F_4$ gas and tapered angle of rail, accuracy of rail width, etc. when rails of 100 μm in width and 6 μm in groove depth were formed at an acceleration voltage of 800 V and an ion current density of 0.5 mAcm$^2$. In this case, the mask film thickness was set so that the mask remained even after processing was conducted to a desired rail groove depth.

In the above ion milling, the rail substrate was made of $Al_2O_3 \cdot TiC$ and the mask was made of a positive photoresist. As to the concentration of $C_2H_2F_4$ gas, a range of $0$–$2.5 \times 10^{-8}$ mol/l was studied. When the concentration of $C_2H_2F_4$ gas was lower than $1.5 \times 10^{-8}$ mol/l, the plasma in the ion milling apparatus was unstable and hence Ar gas was added to $CH_2FCF_3$ gas to control the vacuum in the vacuum chamber so that the total gas concentration became $1.5 \times 10^{-8}$ mol/l. The vacuum when the total gas concentration was $1.5 \times 10^{-8}$ mol/l, was about $2.5 \times 10^{-4}$ Torr. Since the rail width varied depending upon the site of rail, a particular rail site having a width of 100 μm was selected and the rail dimension was studied on this particular site.

FIG. 6 is a graph showing the relation between concentration (mol/l) of $C_2H_2F_4$ gas and rail width after the rail depth of 6 μm was formed, when the initial mask film thickness was 7 μm and the initial tapered angle β of mask was 70–880. The rail width before processing (i.e. the width of mask pattern before processing) is 100 μm and decreases after processing and, as shown in FIG. 5, the decrease in rail width is smaller when the concentration of $C_2H_2F_4$ gas is higher.

FIG. 7 shows the relation between concentration of $C_2H_2F_4$ gas and tapered angle α of rail, and FIG. 8 shows the relation between tapered angle α of rail and accuracy of rail width. By increasing the gas concentration, the tapered angle α of rail becomes larger as shown in FIG. 7 and, as a result, the accuracy of rail width increases as shown in FIG. 8.

Of the processing accuracies in rail formation, the accuracy of rail width is required to be 3 μm/μm or smaller for an arbitrarily selected rail width of 100 μm. To satisfy this requirement, it is effective to set the gas concentration at $0.2 \times 10^{-8}$ mol/l or higher and the tapered angle α of rail at 55° or larger as is clear from FIG. 7 and FIG. 8. That is, by making the tapered angle α of rail larger than 55°–60°, rail(s) of high width accuracy can be formed.

Figure 33:
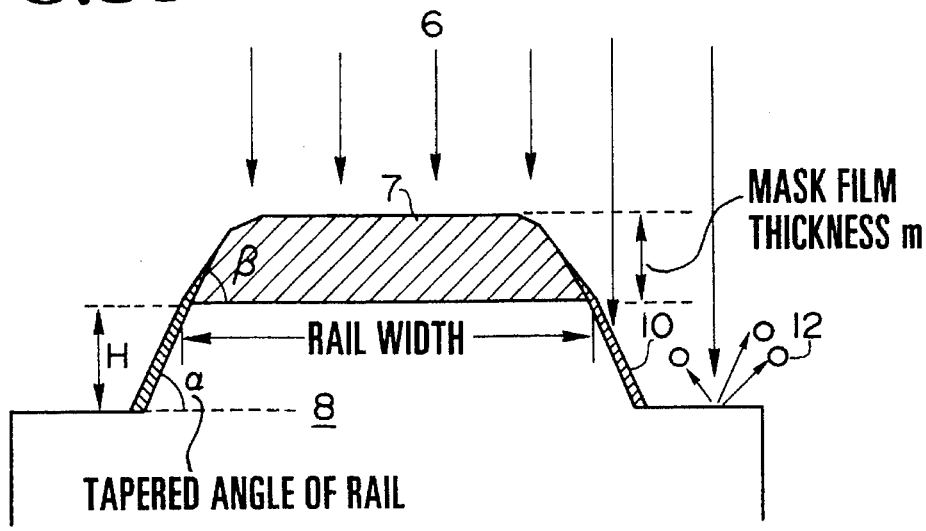
FIG. 33 is a drawing for explaining a model of ion milling of rail.
Figure 34:
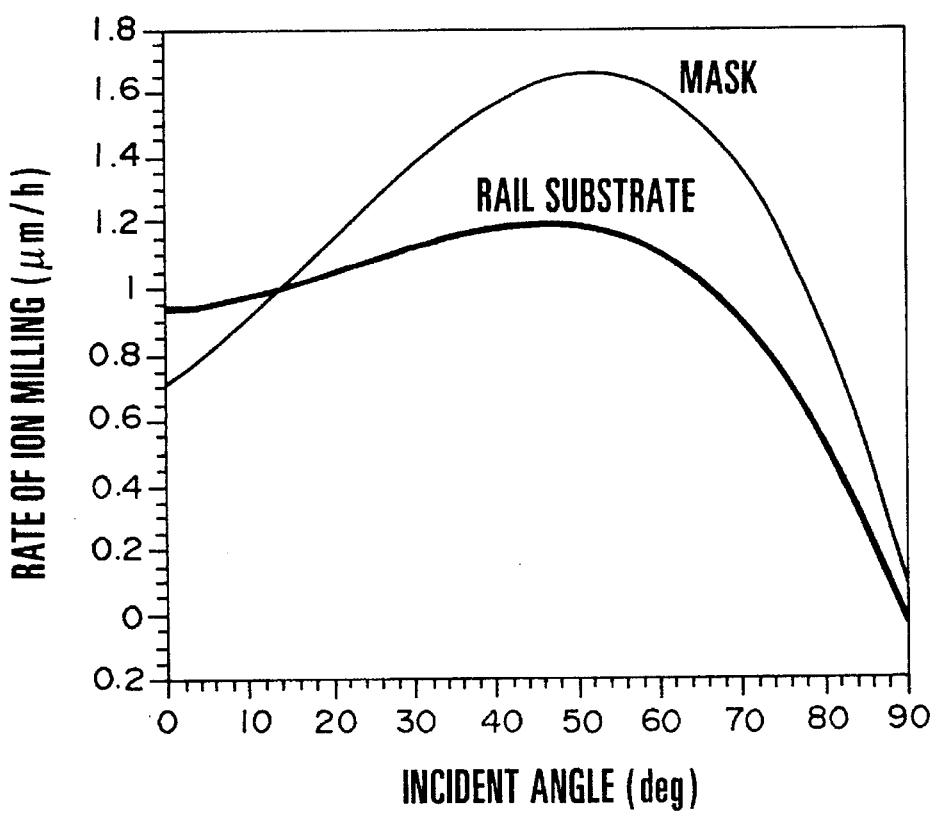
FIG. 34 is a graph showing the angular dependences of ion milling rates.

From the above, it is appreciated that increase in gas concentration results in a larger tapered angle α of rail and simultaneously in a higher width accuracy of rail. Thus, a higher gas concentration is advantageous to secure processing accuracies. When the gas concentration is $1.3 \times 10^{-8}$ mol/l or higher, however, the tapered angle α of rail is larger than 85° as shown in FIG. 7 and the redeposition layer 10 shown in FIG. 33 is formed on each rail side at a higher probability; thus, it is impossible in some cases to obtain a magnetic head having excellent properties in practical application. Also when the gas concentration is $1.3\times10°$ or higher, a polymer of ion milling gas deposits on the mask top surface to form a film and the film must be removed after the completion of ion milling; thus, such a gas concentration is not appropriate in mass production.

For the reasons mentioned above, the tapered angle $\alpha$ of rail is set most preferably at 55°–85° in order to form rail(s) superior in properties such as width accuracy, no redeposition, no polymer deposition and the like.

In the present Example, there is an appropriate range for the initial mask film thickness to be employed in rail formation. The lower limit of the appropriate range is such an initial mask film thickness as to allow for the presence of a residual mask after ion milling and specifically 3 µm generally. Meanwhile, the upper limit must not be larger than 35 µm. The reason is that an initial mask film thickness larger than 35 µm allows the sputtered material to redeposit on the sides of mask and rail at a far higher probability during ion milling.

As described above, by controlling the initial mask film thickness within an appropriate range and the concentration of $C_2H_2F_4$ gas at $0.2\times10^{-8}$–$1.3\times10^{-8}$ mol/l, the resulting rail(s) has (have) a tapered angle $\alpha$ of 55°–85° and a width accuracy of 3 µm or lower, whereby desired rail(s) meeting a required specification can be formed and also rail(s) of excellent properties having no residual redeposition layer can be formed.

Next, by referring to FIG. 9 to FIG. 11, there are described the reasons why, as mentioned previously, a higher concentration of $C_2H_2F_4$ gas gives a larger tapered angle $\alpha$ of rail and a higher accuracy of rail width.

FIG. 9 is a graph showing the relation between $CH_2FCF_3$ gas concentration and selectivity (represented by the following formula), and gives selectivities when ion milling was conducted at various $C_2H_2F_4$ gas concentrations with the incident angles of ion beam to rail substrate and mask set both at 0°.

Selectivity=(ion milling rate of rail substrate)÷(ion milling rate of mask)

From the above, it is appreciated that increase in gas concentration results in a larger selectivity and a larger tapered angle $\alpha$ of rail and simultaneously in a higher width accuracy of rail. Thus, a higher gas concentration is advantageous to secure processing accuracies. When the gas concentration is $1.3\times10^{-8}$ mol/l or higher, however, the tapered angle $\alpha$ of rail is larger than 85° as shown in FIG. 7 and the redeposition layer 10 shown in FIG. 33 is formed on each rail side at a higher probability; thus, it is impossible in some cases to obtain a magnetic head having excellent properties in practical application. Also when the gas concentration is $1.3\times10^{-8}$ mol/l or higher, a polymer of ion milling gas deposits on the mask surface to form a film and the film must be removed after the completion of ion milling; thus, such a gas concentration is not appropriate in mass production.

For the reasons mentioned above, the tapered angle $\alpha$ of rail is set most preferably at 55°–85° in order to form rail(s) superior in properties such as width accuracy, no redeposition, no polymer deposition and the like.

FIGS. 10A and 10B are is graphs showing the angular dependences of the ion milling rates of mask and rail substrate when Ar was used as an ion milling gas, and FIGS. 11A and 11B are graphs showing the angular dependences of the ion milling rates of mask and rail substrate when a mixed gas of Ar and $C_2H_2F_4$ was used as an ion milling gas. Incidentally, the Ar gas concentration in FIGS. 10A and 10B was $1.5\times10^{-8}$ mol/l, and the Ar and $C_2H_2F_4$ gas concentrations in FIGS. 11A and 11B were both $0.75\times10^{-8}$ mol/l.

While it is generally known that the ion milling rate of rail substrate is mainly constant and 1 µm/h independently of the $CH_2FCF_3$ gas concentration when the incident angle of ion beam is 0°, FIG. 9 shows that a higher $C_2H_2F_4$ gas concentration gives a higher selectivity. This indicates that the ion milling rate of mask is smaller when the $C_2H_2F_4$ gas concentration is higher.

Now, the angular dependence of the ion milling rate of mask when the inclination angle of substrate was set at 0°, in FIG. 10A is compared with that in FIG. 11A. The two angular dependences show similar tendencies overall, but the value of ion milling rate of mask is considerably small and about ⅓ when a mixed gas of Ar and $C_2H_2F_4$ was used, as compared with when Ar gas alone was used. The difference in absolute value between the two ion milling rates is particularly large when the incident angle of ion beam is between 40° and 60°.

As shown in FIG. 9 and FIG. 10, a higher concentration of $C_2H_2F_4$ gas gives a smaller ion milling rate of mask, particularly each mask side. As a result, in the change with time, of rail sectional shape in the ion milling shown in FIG. 35, the regression amount of rail width decreases and the accuracy of rail width increases.

Particularly important here is that when $C_2H_2F_4$ gas is used either alone or as a mixed gas, the ion milling rate of mask decreases depending upon the gas concentration but the ion milling rate of rail substrate is substantially constant independently of the gas concentration. This specificity of ion milling rate when $C_2H_2F_4$ is used, allows for a higher accuracy of rail width.

The $C_2H_2F_4$ gas can be used alone as mentioned above, but may be used as a mixture with a rare gas such as He, Ne, Ar, Xe or the like. The amount of rare gas mixed is determined so that a vacuum suitable for ion milling (1-5× $10^{-4}$ Torr) can be obtained. The mixing of rare gas gives slight change in ion milling rate or rail width accuracy, but this mixing gives no adverse effect on rail formation because the ion milling rate and rail width accuracy are influenced mostly by the $C_2H_2F_4$ gas concentration.

As in the case of $C_2H_2F_4$ gas for higher accuracy of rail width, use of a fluorinated hydrocarbon gas similar to $CH_2FCF_3$ can give a similar effect. Such an ion milling gas giving the similar effect includes, for example, hydrogen-containing flon gases, i.e., fluorinated hydrocarbon type flon gases such as $CH_2F_2$, $CH_3F$, $C_2H_3F_3$ and $C_2H_4F_2$ gases although their effects are inferior to the effect of $C_2H_2F_4$.

With these fluorinated hydrocarbon type flon gases, no sufficient effect is obtained when they are used singly. Moreover, in the case of single use, redeposition takes place at a higher probability; the chamber inside of ion milling apparatus is stained more; and the reproducibility in mass production is low in some cases. The reasons are not fully clarified but are presumed to be that said gases tend to polymerize in the ion milling apparatus to form a polymer film and the polymer film stains the vacuum chamber.

The problems in single use of said gases, however, can be solved by mixing one of $CH_2F_2$, $CH_3F$, $C_2H_3F_3$ and $C_2H_4F_2$ gases with Ar or Xe at appropriate proportions. Table 1 shows examples of the relations between mixing proportions of said two gases and rail width accuracy. In Table 1, "flon gas" refers to any of $CH_2F_2$, $CH_3F$, $C_2H_3F_3$ and $C_2H_4F_2$ gases.

TABLE 1

Relations between flon gas concentration and rail width accuracy

| Flon gas concent. (mol/l) | Ar concent. (mol/l) | Tapered angle of rail (deg) | Rail width accuracy (μm/μm) |
| --- | --- | --- | --- |
| $3.0 \times 10^{-9}$ | $14 \times 10^{-9}$ | 65 | 3.0 |
| $6.0 \times 10^{-9}$ | $12 \times 10^{-9}$ | 70 | 2.5 |
| $8.0 \times 10^{-9}$ | $10 \times 10^{-9}$ | 80 | 2.0 |
| $10.0 \times 10^{-9}$ | $3 \times 10^{-9}$ | 82 | 1.9 |
| $15.0 \times 10^{-9}$ | 0 | 88 | Redeposition occurred. |

As is clear from Table 1, the appropriate concentration of the flon gas is appropriately $3-13 \times 10^{-9}$ mol/l and a rare gas (e.g. Ar), $SF_6$ or the like is preferably added thereto in a concentration of $3-14 \times 10^{-9}$ mol/l. It was also made clear that when the flon gas was used singly, the rail shape varied greatly and no reliable data was obtained and that a chlorine-containing gas could give no satisfactory results.

Figure 12:
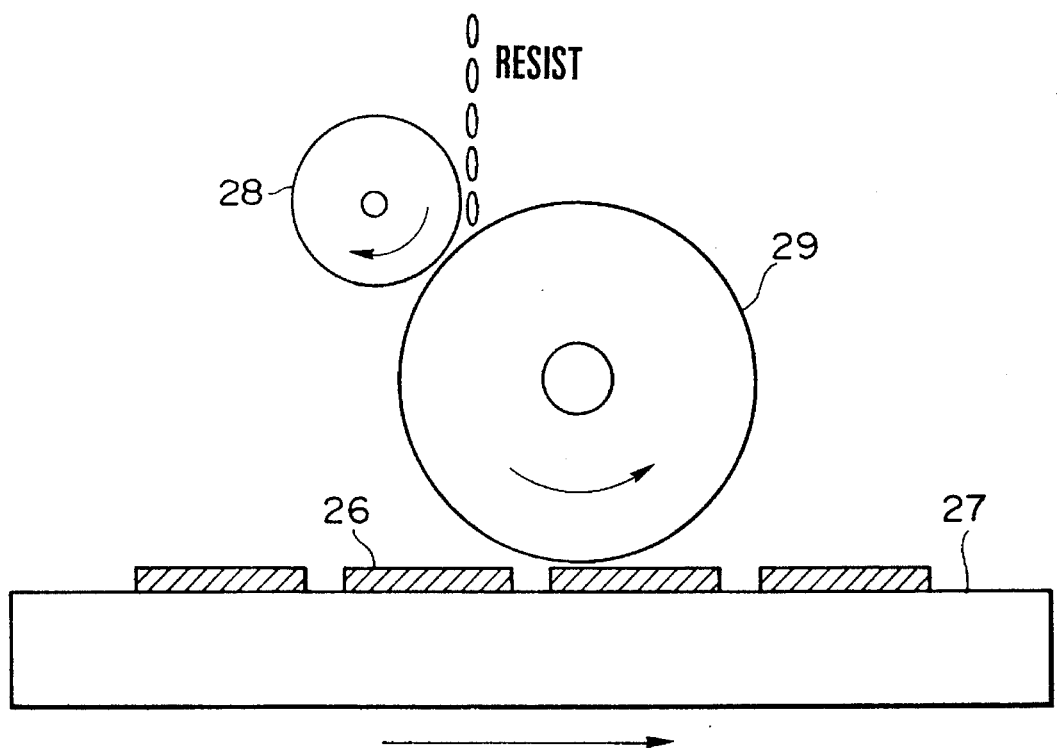
FIG. 12 is a schematic drawing showing an apparatus for resist coating by rolls.

Next, description is made on the chamfering of magnetic head at the air outlet end in the rail formation process of the present invention, by referring to FIG. 12 and FIG. 13.

FIG. 12 is a schematic drawing showing an apparatus for resist coating by rolls, and FIG. 13 is a drawing showing the shape of the resist coated in FIG. 12 and a process of chamfering.

Figure 30:
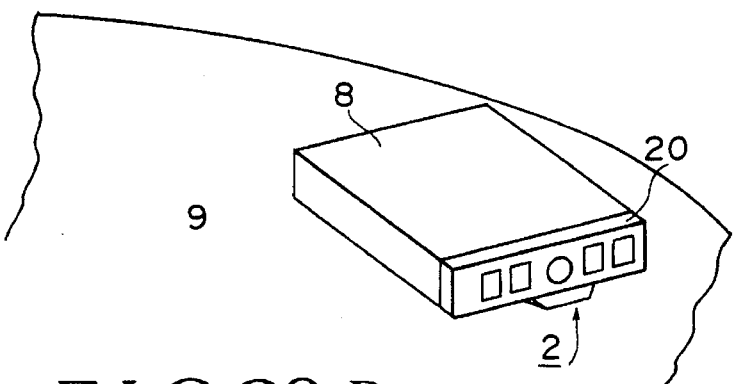
FIGS. 30A–30C are schematic drawings for explaining the flying state of a magnetic head.
Figure 30:
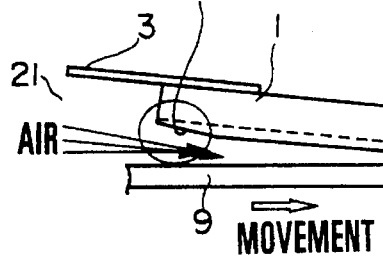
Figure 30:
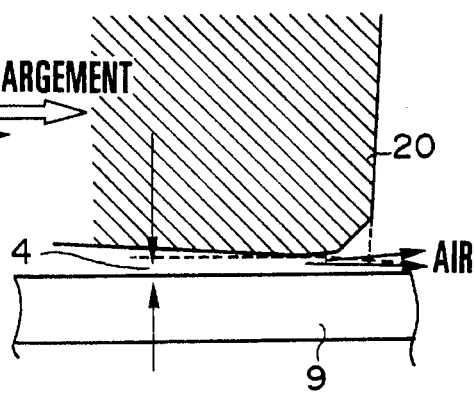
Figure 31:
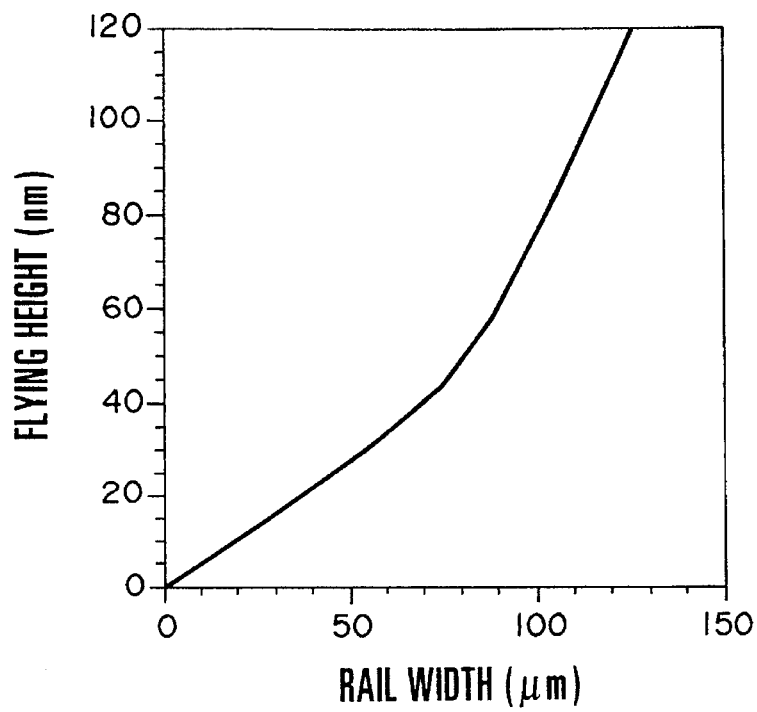
FIG. 31 is a graph showing the relation between rail width and flying height.
Figure 32:
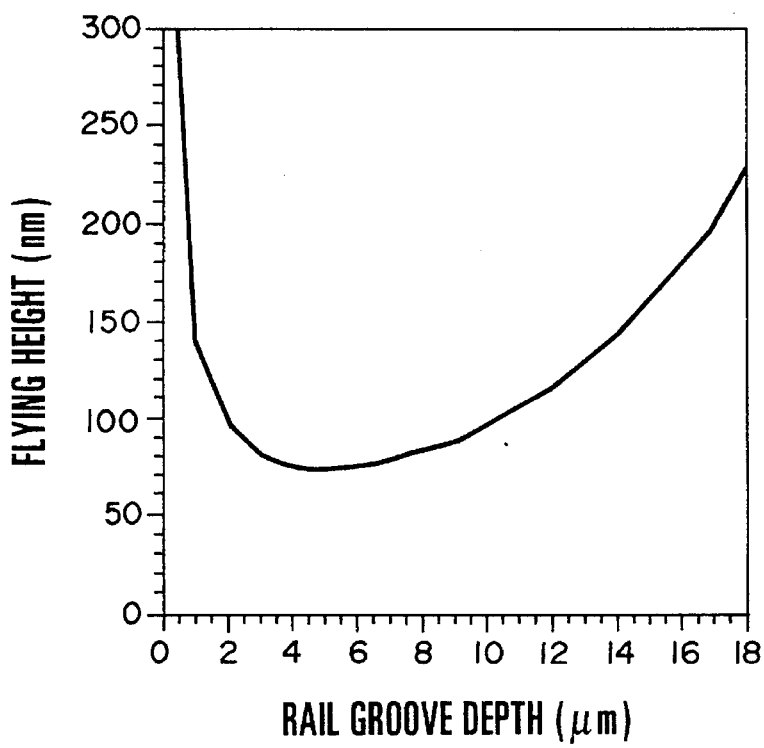
FIG. 32 is a graph showing the relation between rail groove depth and flying height.

FIG. 12 shows an example of the apparatus for resist coating (this resist coating is necessary for simultaneously conducting, by ion milling, the formation of the rail top surface 2a shown in FIG. 30 and the chamfering of the air outlet end 22 shown in FIG. 30. While a plurality of head blocks 26 arranged on a fixation jig 27 for head blocks are moved to a direction shown by an arrow, a resist is dropped into between a roll 28 and a coating roll 29 both being rotated and the head blocks 26 are contacted with the coating roll 29, whereby the resist is coated on the head blocks 26. Thus, a resist mask 7 is formed on each head block 26, as shown in FIG. 13B. As shown in FIG. 13C, the resist mask 7 is very thin at the end (A portion) of the element portion 20 of each head block 26 because of the wettability of resist to substrate or protective film and the surface tension of resist and rises at an inner portion (B portion) near the A portion. This A portion can be formed by setting the viscosity of resist at 60–500 cp, the distance between roll 28 and coating roll 29 at 0.5–5 mm and the distance between coating roll 29 and head block 26 at 0.01–0.8 mm. Also, the thickness and length of coating can be controlled as necessary by conducting the resist coating by rolls a plurality of times.

The resist coated as above is subjected to light exposure and development to form a mask pattern. The thus formed mask is subjected to the above-mentioned ion milling to form rail(s). During this ion milling for rail formation, the end of the element portion 20, i.e. the air outlet end 22 of the magnetic head 1, having a very thin resist mask 7 thereon, undergoes ion milling, whereby a chamfered portion 25 as shown in FIGS. 13D and E is formed. In this case, the chamfering amount of the chamfered portion is desirably D (depth)=1–50 μm and L (length)=3–40 μm so that the element per se of the element portion 20 undergoes no milling and the flying characteristic of head is not impaired. Incidentally, the sectional view of FIG. 13C is a sectional view taken at the A—A' line in FIG. 4.

In the above method for formation of chamfered portion 25, the chamfering, which is effective to increase the reliability of magnetic head flying, can be conducted simultaneously with rail formation and consequently makes mass production easy. Thus, the above method is excellent industrially.

When there is used, as the mask material, a film, for example, the film gives a uniform mask thickness; resultantly, the mask thickness is the same at the end of the element portion 20 and at the center of the substrate, making it possible to conduct chamfering simultaneously with ion milling. Needless to say, if no chamfering is conducted, the front portion of the air outlet edge 22 is easily destroyed when the magnetic head 1 contacts with the magnetic disc 9, and the destruction chips formed by the contact penetrate into between the magnetic head 1 and the magnetic disc 9 and cause head crush; this problem, however, can be solved by forming a chamfered portion 25.

The above-mentioned chamfering of the present invention is expected to give a similar effect also in the second Example which is described below.

Figure 1:
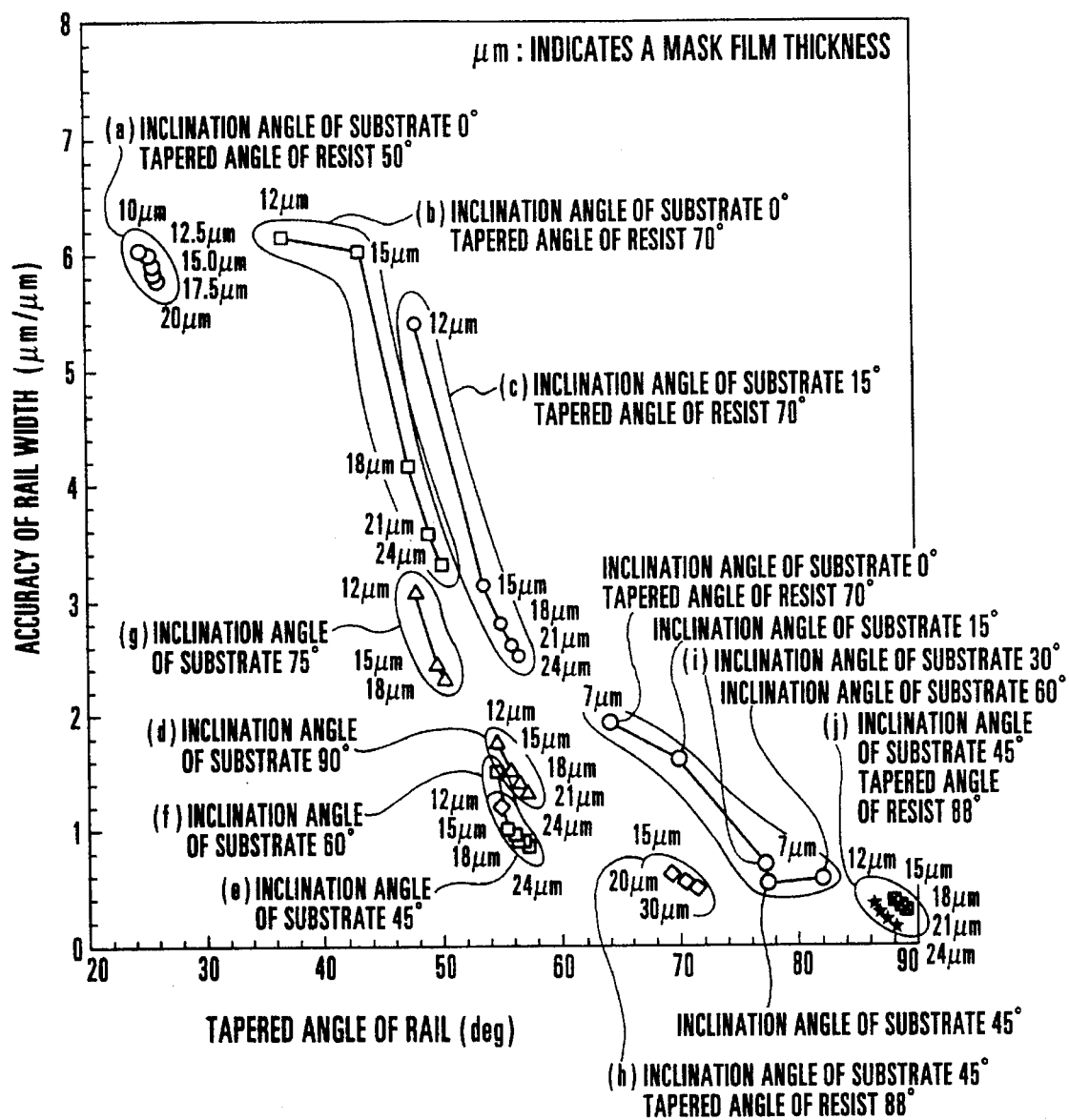
FIG. 1 is a drawing showing the relations between tapered angle and width accuracy, of the rails formed under various conditions.

Next, the second Example of the present invention is described by referring to FIG. 1, FIG. 10 and FIG. 11.

FIG. 1 is a drawing showing the relations between tapered angle and width accuracy, of the rails formed under various conditions.

In the present Example, ion milling was conducted by setting the inclination angle θ of the substrate for material to be processed, placed in the ion milling apparatus of FIG. 5, at 30°–60° and by rotating the substrate at least at 1 rpm, to form rail(s) having a tapered angle of 55°–90°, preferably 55°–85° and thereby having an improved width accuracy.

Here, the "inclination angle θ of substrate" refers to an inclination angle of substrate to the ion beam applied thereto via an electrode for ion extraction, and the inclination angle is 15°–75°. The number of rotations of substrate is preferably 1–100 rpm but is not particularly restricted to this range. It is important that by employing the inclination of substrate and the rotation of substrate simultaneously, the incident angle of ion beam is not restricted to a particular angle but can be varied so as to achieve desirable rail formation. Here, the "rotation of substrate" refers to the rotation of a single substrate, or the rotation of a substrate consisting of a fixation jig 27 for head blocks and a large number of magnet head elements arranged on said jig, as shown in FIG. 2 and, for example, when a large number of substrates are treated at one time, includes the rotation of the individual substrates and the rotation of a substrate holder having said those substrates mounted thereon.

The results when rail formation was conducted under the conditions shown in Table 2, are described below by referring to FIG. 1.

TABLE 2

Conditions for magnetic head rail formation when substrate rotation and inclination were employed

| | |
| --- | --- |
| Substrate rotation | 1–100 rpm |
| Ion milling gas | rare gas, $SF_6$, fluorinated hydrocarbon, mixture of rare gas, $SF_6$ and fluorinated hydrocarbon |
| Ion current density | 0.3–1.5 mA/cm² |
| Acceleration voltage | 300–1,200 V |
| Substrate inclination angle | 15–60° |
| Mask film thickness | 3–30 μm |
| Mask material | resist (or polymer film) |

TABLE 2-continued

Conditions for magnetic head rail formation
when substrate rotation and inclination were employed

| | |
|---|---|
| Initial mask tapered angle β | 50°, 70°, 88° |
| Rail substrate material | $Al_2O_3$.TiC, zirconia, ferrite, alumina |

In FIG. 1, "tapered angle of resist" refers to a tapered angle β of mask shown in FIG. 33, and each numeral value (unit: μm) refers to an initial mask film thickness m.

In FIG. 1, group (a) is a comparative case for the present invention and shows a result when ion milling was conducted using Ar as an ion milling gas, at an initial (before ion milling) mask tapered angle β of 50°, at initial (before ion milling) mask film thicknesses m of 10–20 μm and at a substrate inclination angle θ of 0°. The rail tapered angles α obtained were small (about 25°) and the rail width accuracies obtained were large (about 6 μm/μm). Thus, no good rail 2 could be formed in this comparative example.

In FIG. 1, group (b) is also a comparative case and shows results when ion milling was conducted using Ar as an ion milling gas, at an initial mask tapered angle β of 70°, at initial mask film thicknesses m of 12–24 μm and at a substrate inclination angle θ of 0°. In this case, as the initial mask film thickness m becomes larger, the rail tapered angle α becomes larger and also the rail width accuracy becomes higher almost in proportion to the change of the rail tapered angle. However, there was obtained no such rail width accuracy as is not influenced by variations in various processing conditions in mass production.

In FIG. 1, group (c) is a case of the present invention and shows results when ion milling was conducted using Ar as an ion milling gas, at an initial mask tapered angle β of 70°, at initial mask film thicknesses m of 12–24 μm and at a substrate inclination angle θ of 15°. With respect to the influence of the initial mask film thickness m, there is seen a tendency similar to that in the above group (b) where the substrate inclination angle θ was 0°. However, when comparison is made at the same mask film thickness m, a larger rail tapered angle α and accordingly a better rail width accuracy were obtained when the rotation of substrate and the inclination of substrate were employed. In this case, a good rail 2 can be formed by setting the initial mask film thickness m at 18 μm or larger.

In FIG. 1, groups (d), (e) and (f) are each a case of the present invention and show results when ion milling was conducted using Ar as an ion milling gas, at substrate inclination angles θ of 30°–450 and 60° respectively. It is appreciated that when the substrate inclination angle θ is 30°–60°, the rail tapered angle θ becomes about 55° or larger and the rail width accuracy is also good. At each substrate inclination angle θ, the rail width accuracy is better as the initial mask film thickness m is larger, but the optimum substrate inclination angle θ is 45°.

In FIG. 1, group (g) is a comparative case similar to the groups (a) and (b) and shows results when ion milling was conducted using Ar as an ion milling gas, with the substrate inclination angle θ set at 75°. In this case, the rail tapered angle α is smaller than those obtained in the groups (d), (e) and (f) where the substrate inclination angles θ were set at 30°–60° and the rail width accuracy is also lower.

In FIG. 1, group (h) is a case of the present invention and shows results when ion milling was conducted using Ar as an ion milling gas, at a substrate inclination angle θ of 45°, at a mask tapered angle α of 88° and at initial mask film thicknesses m of 15–30 μm. In this case, the rail tapered angle α is large at about 70° and the rail width accuracy is also very good at 1 μm/μm or lower.

While it is generally thought that making large the initial mask film thickness m and making large the mask tapered angle β is effective to obtain a higher rail width accuracy, making large the initial mask film thickness m incurs the following disadvantages.

(1) When a mask of large initial film thickness m is formed by spin coating, it is necessary to conduct coating many times or to use a photoresist of high viscosity. Moreover, coating of resist is difficult, drying of coated resist takes a longer time, and cracks appear easily.

(2) Since a longer time is needed for light exposure and development and light diffraction takes place during light exposure, it is difficult to form a mask of large tapered angle β. It is currently impossible, therefore, to employ an initial mask film thickness m of 35 μm or larger.

As described above, when Ar is used as an ion milling gas, a high rail width accuracy of 3 μm or lower (this is a practically employable range) can be achieved by setting the substrate inclination angle θ at 15°–60° and rotating the substrate. When both the inclination of substrate and the rotation of substrate are employed simultaneously, the ion milling gas usable is not only Ar but also other gas (e.g. Xe) which is used as an ion milling gas or a dry etching gas.

Next, by referring to FIG. 1, there are described the results when ion milling was conducted using, as an ion milling gas, $CH_2FCF_3$ (a fluorinated hydrocarbon) in place of Ar.

In FIG. 1, group (i) is a case of the present invention and shows results when ion milling was conducted at a mask tapered angle β of 70° by varying the substrate inclination angle θ between 0° and 60°. As shown in FIG. 1, also when $C_2H_2F_4$ gas is used, the effect of substrate inclination is large. When the substrate inclination angle θ is 30°–60°, the tapered angle α of the rail formed is particularly large and the rail width accuracy is improved thereby.

In FIG. 1, group (j) is a comparative case and shows results when ion milling was conducted using $C_2H_2F_4$ gas, at a mask tapered angle β of 88° at various substrate inclination angles θ. In this case, the rail tapered angle α was larger than 85° and the rail width accuracy was even better than that in the above group (i). However, since the rail tapered angle α is larger than 85°, a redeposition layer 10 is formed on each side of rail 2 at a high probability as mentioned above, depending upon the variations of working conditions, allowing for no mass production in some cases although the rail width accuracy is high. Hence, in order to allow for mass production, it is necessary to select rails of no redeposition layer 10 to obtain magnetic head products, or to efficiently remove the redeposition layer 10 formed.

Next, there are described the results of a case of the present invention wherein a rail was formed using a mixed gas of Ar and $C_2H_2F_4$ as an ion milling gas, under the following conditions.

The conditions for rail formation were: Ar gas concentration=$0.4 \times 10^{-8}$ mol/l, $C_2H_2F_4$ gas concentration=$1.0 \times 10^{-8}$ mol/l, number of rotations of substrate=5 rpm, ion current density=1.0 mAcm$^2$, acceleration voltage=800 V, substrate inclination angle θ=450, initial mask film thickness m=15 μm, initial tapered angle β of resist mask=80°, and rail groove depth H of rail substrate material $Al_2O_3$.TiC =6 μm. As a result, the formed rail had a tapered angle α of 75° and a width accuracy of 0.8 μm/μm, which were both good, and observation by an electron microscope confirmed that there was no redeposition layer 10.

Further, there are described the results of a case of the present invention wherein a rail was formed using $SF_6$ as an ion milling gas, under the following conditions.

The conditions were $SF_6$ gas concentration=$1.3\times10^{-8}$ mol/l, number of rotations of substrate=10 rpm, ion current density=0.8 $mAcm^2$, acceleration voltage=800 V, substrate inclination angle $\theta=45°$, initial mask film thickness m=20 μm, initial tapered angle β of resist mask=75°, and rail groove depth H of rail substrate material $Al_2O_3$.TiC=6 μm. As a result, similar to the above case, the formed rail had a tapered angle α of 70° and a width accuracy of 1.2 μm/μm, which were both good, and observation by an electron microscope confirmed that there was no redeposition layer 10. The milling rate of rail substrate material $Al_2O_3$.TiC when using $SF_6$ gas is about 3 times (specifically about 3.5 μmh) the milling rate when using Ar or a fluorinated hydrocarbon gas (e.g. $C_2H_2F_4$), enabling effective milling (the milling time can be shortened to about ⅓). Since the selectivity when a high-molecular substance film such as photoresist or the like is used as a mask material, is small, the inclination and rotation of substrate are essential and the mask film thickness is preferably at least 1.5 times, desirably at least two times the groove depth.

In the above, it was described that by inclining and rotating a substrate for a material to be processed, the formed rail has a large tapered angle and a high width accuracy. The reasons are described below.

FIGS. 10 and 11 each show the ion milling rate characteristics when ion milling was conducted under the conditions given in Table 2, i.e., the angular dependences of ion milling rates when ion milling was conducted with the substrate being inclined and rotated. FIGS. 10A and 10B show the data when Ar was used as an ion milling gas, and FIGS. 11A and 11B show the data when $C_2H_2F_4$ was used as an ion milling gas. As is clear from these data, by the employment of substrate inclination and substrate rotation, ion milling rate is smaller in the ion beam incident angle range of 40°–80° as substrate inclination angle θ is larger; and except for the cases of substrate inclination angle θ=75° in FIG. 10B and FIG. 11B, the ion milling rates when ion beam incident angle is 0°, are smallest when substrate inclination angle is 0°.

Figure 35:
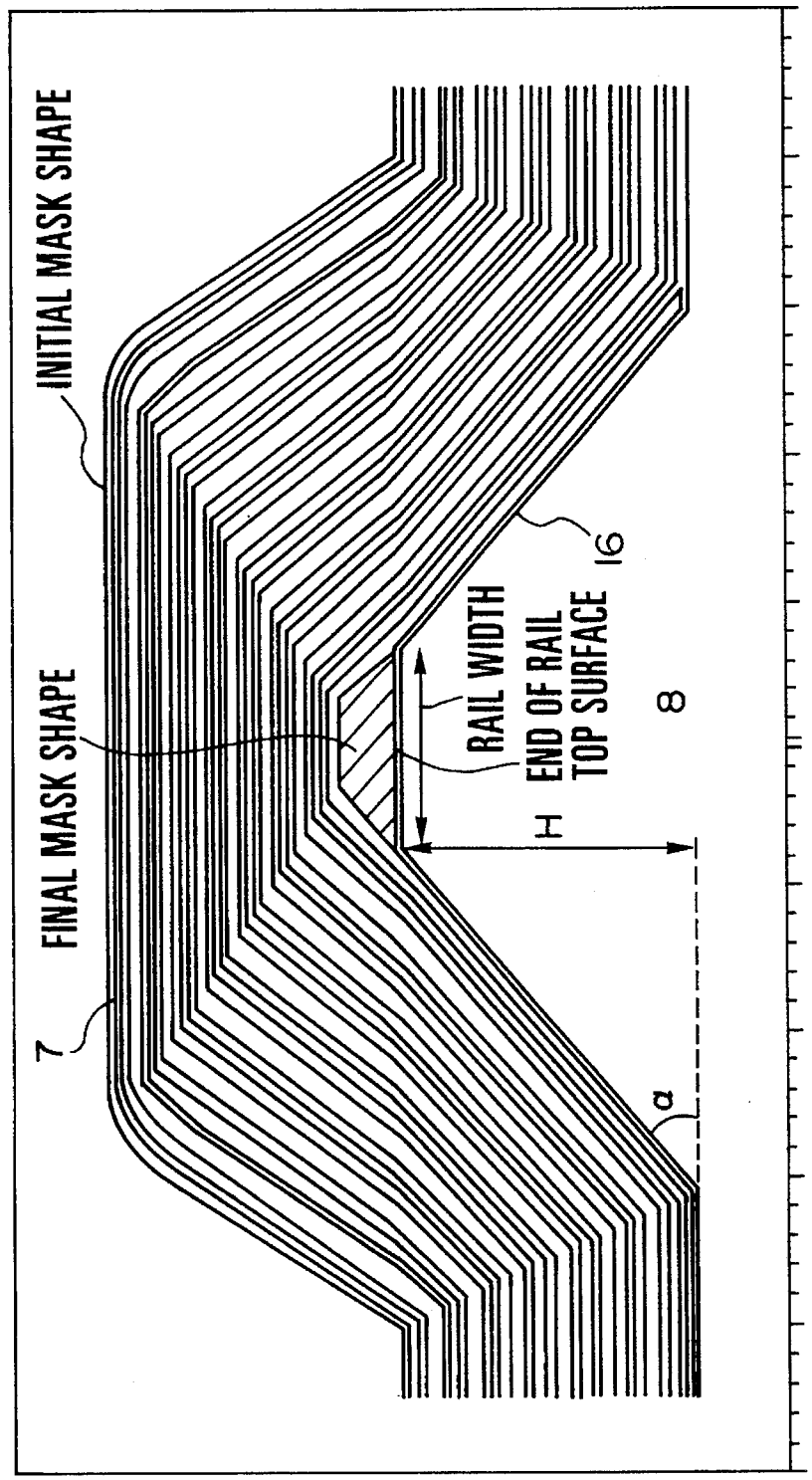
FIG. 35 is a drawing showing the change with time, of rail sectional shape during rail formation.
Figure 36:
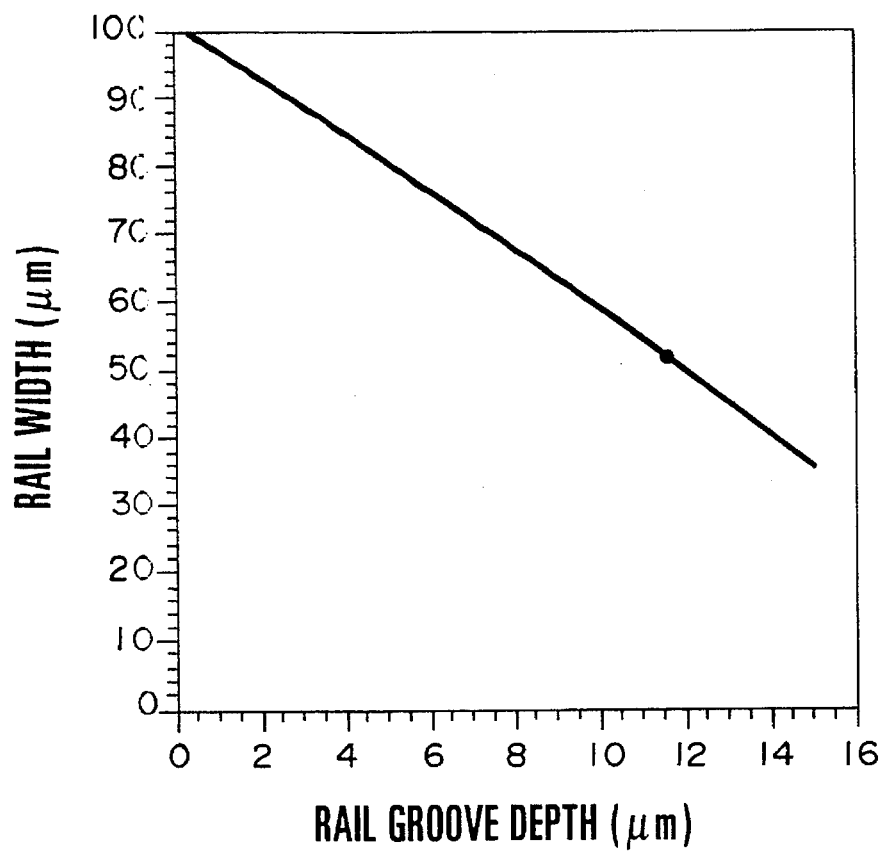
FIG. 36 is a graph showing the relation between rail groove depth and rail width.
Figure 37:
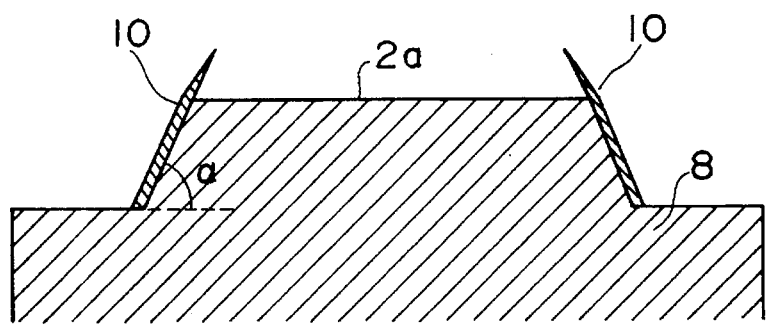
FIG. 37 is a drawing showing the redeposition layers remaining on rail sides.

Owing to the above tendency and the change with time, of rail sectional shape in ion milling, shown in FIG. 35, the ion milling rate of mask 7 during formation of rail 2, particularly the ion milling rate of mask sides when the incident angle of ion beam is 40°–80° (said ion milling rate has an influence on rail width accuracy), becomes small as compared with the case of substrate inclination angle=0°. As a result, the regression rate of mask 7 becomes small; in proportion thereto, the regression amount of rail width becomes small; also, the speed in rail groove depth H direction increases; thereby, the change of rail width to the change of rail groove depth H, i.e. the accuracy of rail width is improved. This improvement in rail width accuracy is striking when substrate inclination angle θ is 30°–75°, as seen in FIGS. 10 and 11. However, when substrate inclination angle θ is 75°, the ion milling rate when the incident angle to rail substrate is 0°, is also small, requiring a longer time for ion milling. Hence, such a substrate inclination angle is not preferable.

The phenomena seen in FIGS. 10 and 11 take place not only when the ion milling gas used is Ar or $CH_2FCF_3$, but also when the ion milling gas is an above-mentioned fluorinated hydrocarbon gas (e.g. $CH_2F_2$, $CH_3F$, $C_2H_3F_3$ or $C_2H_4F_2$) or when the concentration of said gas is varied. Needless to say, higher processing accuracies are obtained when a fluorinated hydrocarbon gas is used than when a rare gas (e.g. Ar) is used.

With respect to the number of rotations of substrate, 1–100 rpm is appropriate according to the experiment conducted. When the number of rotations is smaller than 1 rpm, the effect of substrate rotation is small. When the number of rotations is larger than 100 rpm, severe mechanical abrasion appears although processing is possible, and such a number of rotations is not appropriate for mass production. Since the time needed for rail formation is 1 hour or longer, it is not necessary to use a number of rotations which is larger than required, and it is important to rotate the substrate.

Up to this point, the effects of the present invention were discussed with respect to the accuracy of rail width, i.e., the variation in rail width when the groove depth of rail varies by 1 μm. Below are described the variation in rail width, etc. when there are processing variations other than the variation in rail groove depth, whereby the further advantages of the present invention are shown.

When the formation of the top surface (rail top surface) 2a of magnetic head 1 is conducted in mass production, the factors affecting the accuracy of rail width are (i) variation in mask film thickness m, (ii) variation in mask tapered angle β, (iii) variation in ion milling rate, etc. These variations are specifically described below.

(i) Variation in mask film thickness m . . . variation in viscosity of photoresist and variations in conditions of spin coating. When a film is used, variation in film thickness, variations in conditions of light exposure and development, etc.

(ii) variation in mask tapered angle β. . . variation in photolithography, specifically variations in light intensity of ultraviolet lamp, light exposure time, development time, developer and temperature, etc.

(iii) Variation in ion milling rate . . . Variations in staining inside the vacuum chamber of ion milling apparatus, gas concentration and its distribution, ion current density, vacuum, etc.

The above variations seen in the large-scale formation of rail top surface can be represented by the variation in ion milling rate and the variation in mask shape. As shown in the following tables comparing the conventional technique and the technique of the present invention, the present Example can form a rail which is smaller in quality variation, that is, has more stable quality than before when there are the above variations. Table 3 shows the comparison of processing conditions, and Table 4 shows the comparison of the accuracy of rail width when there are other processing variations.

TABLE 3

| | Comparison of processing conditions | |
|---|---|---|
| Item | Conventional technique | Technique of present invention |
| Ion milling gas | Rare gas | Ar or Flon or $SF_6$ or mixture thereof |
| Substrate inclination angle | 0° | 15–60° |
| Substrate rotation | No | 1–20 rpm |
| Rail tapered angle | 25–50° | 55–85° |

TABLE 4

Variation in rail width
when there are other processing variations

| Variation factor | Median and variation | Conventional technique | Technique of present invention |
| --- | --- | --- | --- |
| Mask thickness | 10 ± 1 μm | ±0.5 μm | ±0.04 μm |
| Mask tapered angle | 70° ± 5° | ±2.0 μm | ±0.8 μm |
| Ion milling selectivity | 10% | ±2.5 μm | ±0.4 μm |

As shown in Table 3 and Table 4, by conducting ion milling using Ar or $SF_6$ or $C_2H_2F_4$ or a mixture thereof as an ion milling gas, at a substrate inclination angle θ of 15°–60° at a number of rotations of substrate, of 1–20 rpm to obtain a rail tapered angle α of 55°–85°, it is possible to control the variation in mask shape represented by mask film thickness m and mask tapered angle β and the variation in ion milling rate (the variation in selectivity), each at a small value, as compared with those in the conventional technique.

In the above embodiments, when substrate inclination and substrate rotation are employed independently, no desired striking effect is obtained. When, for example, substrate rotation alone is employed and no substrate inclination is employed, no good rail can be formed unless initial mask film thickness m and gas (e.g. $C_2H_2F_4$) concentration are maintained at respective appropriate levels, as mentioned in the first Example employing a substrate inclination angle θ of 0°. Also, when in the second Example no substrate rotation is conducted, the rail tapered angles α obtained are not balanced at both sides of rail; as a result, no high accuracy in rail width can be obtained and, moreover, there arises nonuniformity in flying characteristic owing to the difference in circumferential speed between the inner and outer circumferences of disc, making it impossible to obtain a magnetic head of excellent properties.

As in the first Example, also in the present Example, an appropriate range exists with respect to the initial mask film thickness m to be used. Specifically, the lower limit must be generally 5 μm, which is the smallest film thickness allowing for the presence of mask after ion milling. The upper limit must not exceed 35 μm. The reason is that when the initial mask film thickness m exceeds 35 μm, the sputtered material redeposits on mask sides and rail sides at a very high probability during ion milling. Also when the ion milling gas used is changed from Ar to Xe or He or $SF_6$, or from $C_2H_2F_4$ to other fluorinated hydrocarbon gas (e.g. $CH_2F_2$, $CH_3F$, $C_2H_3F_3$ or $C_2H_4F_2$), the same processing accuracies as in the above embodiments can be obtained by optimizing the concentration of said gas and initial mask film thickness m.

Figure 14:
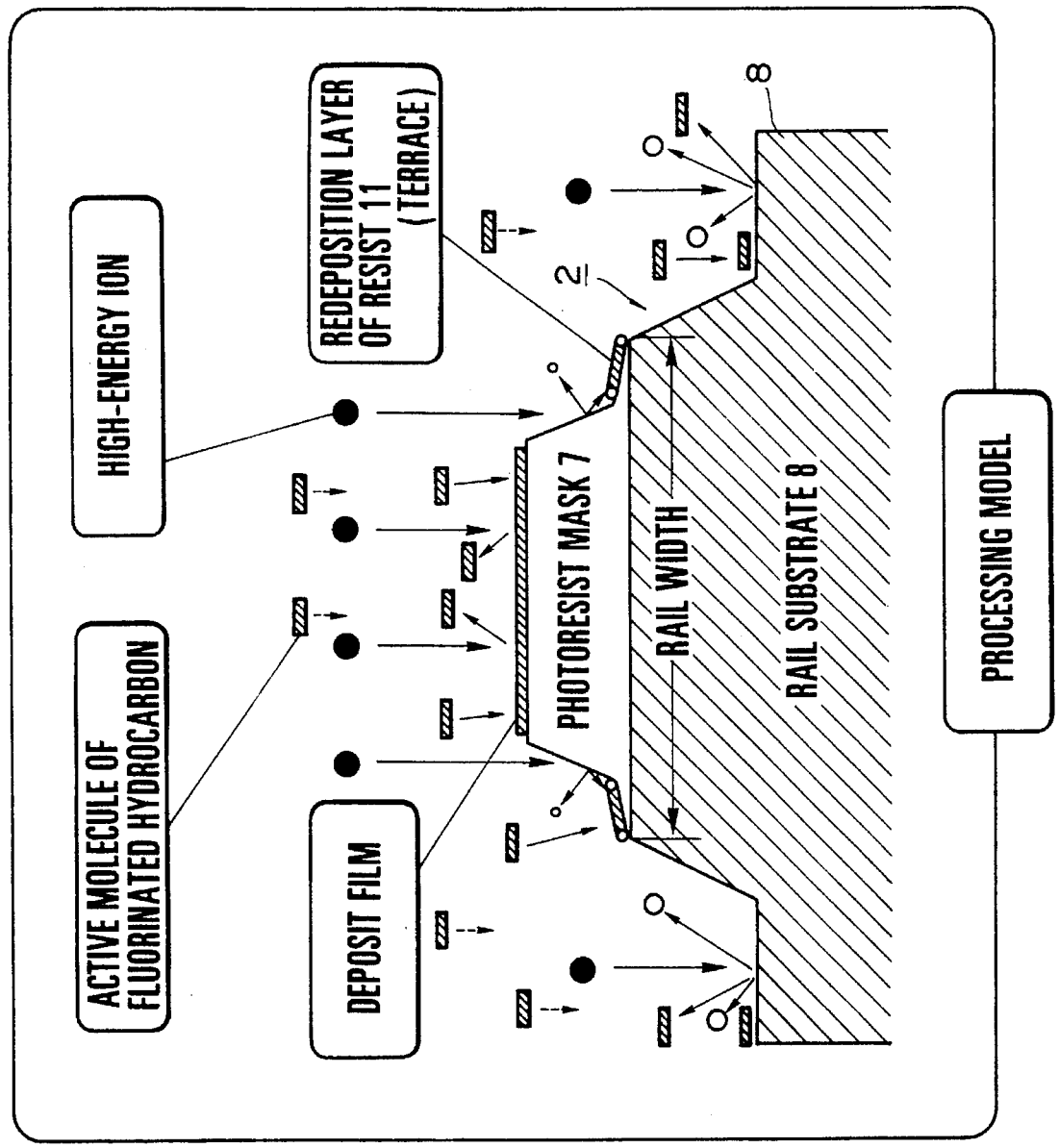
FIG. 14 is a drawing showing a model of rail formation using $C_2H_2F_4$ as an ion milling gas.

Next, by referring to FIG. 14, there is described the first unique phenomenon seen when in the first and second Examples, ion milling was conducted using a fluorinated hydrocarbon (e.g. $C_2H_2F_4$) gas as an ion milling gas.

FIG. 14 is a drawing showing a model of rail formation using $C_2H_2F_4$ as an ion milling gas.

In FIG. 14, 11 is a terrace of a resist redeposition layer formed on each side of a mask (a photoresist mask) 7. The terrace 11 is formed when in the ion milling using $C_2H_2F_4$ as an ion milling gas, the high-molecular substance sputtered at each side of the mask 7 redeposits on the surface of a ceramic rail substrate 8. This formation of terrace 11 suppresses the regression of each side of a rail 2, i.e. the decrease in dimension of the mask 7 during ion milling, making possible the formation of a rail of high dimensional accuracy. Such formation of terrace 11 takes place also when a fluorinated hydrocarbon gas (e.g. $C_2H_3F_3$ or $C_2H_4F_2$) other than $C_2H_2F_4$ is used, but does not take place when a generally used gas (e.g. Ar or $CF_4$) is used. For said formation of terrace 11, an initial mask film thickness m of about 3 μm or larger and a large selectivity are presumed to be requisite.

Then, there is described the second unique phenomenon seen when conducting ion milling using a fluorinated hydrocarbon gas an ion milling gas. It relates to the staining of the side 1a of magnetic head 1. The "side 1a of magnetic head 1" refers to a side of magnetic head perpendicular to the rail top surface 2a of magnetic head, including the side 20a of the element portion 20 of magnetic head, as shown in FIG. 4. The side 1a is stained by various substances because sputtered substances adhere thereon during ion milling. After the completion of ion milling, the stains on the side 1a are removed by washing with water, an organic solvent or the like. When there is used a conventional ion milling gas of general use (e.g. Ar or $CF_4$), a considerably long time is required for the removal of the stains. It is presumed to be because the components of the stains are metals and ceramics such as stainless steel (a material of vacuum chamber), molybdenum (a material of ion milling electrode), alumina titanium carbide (a material of magnetic head substrate) and the like and these substances adhere on the side 1a with large kinematic energies. Meanwhile, when a fluorinated hydrocarbon gas is used as an ion milling gas, the above stains can be removed easily with water or an organic solvent. The reason is presumed to be that a thin film of a fluorinated hydrocarbon is formed on the side 1a of magnetic head 1 during ion milling and said stains are removed together with the thin film by a principle similar to lift-off. This easy removal of stains has no direct connection with the flying characteristic of magnetic head 1; however, when a magnetic disc device is operated for a long time with the stains left unremoved, presumably the stains are detached and cause head-crush. Thus, the easy removal of stains is a solution to one major problem encountered in mass production of magnetic disc device.

When, for example, a person skilled in the art forms a rail 2 of the present invention according to the first Example and the second Example, it is anticipated to try to increase the ion milling rate for higher workability by increasing the plasma density of ion milling apparatus or by increasing the voltage of ion extraction electrode to obtain a larger ion current. At that time, it is considered that the substrate receives a higher energy and its temperature increases and, as a result, the temperature of the mask increases and the ion milling rate of the mask increases extremely. In such a case, unlike the results seen in the first and second Examples, the selectivity decreases and there may be obtained no rail of high accuracy as intended by the present invention. As an effective measure for such a case, however, there is a method of cooling the rail substrate with a gas such as He or the like, that is, suppressing the temperature increase of substrate by gas cooling; or, it is possible to make up the reduction in selectivity by optionally increasing the concentration of a fluorinated hydrocarbon (e.g. $C_2H_2F_4$) gas. Thus, the effects of the first and second Examples can be secured.

Figure 15A:
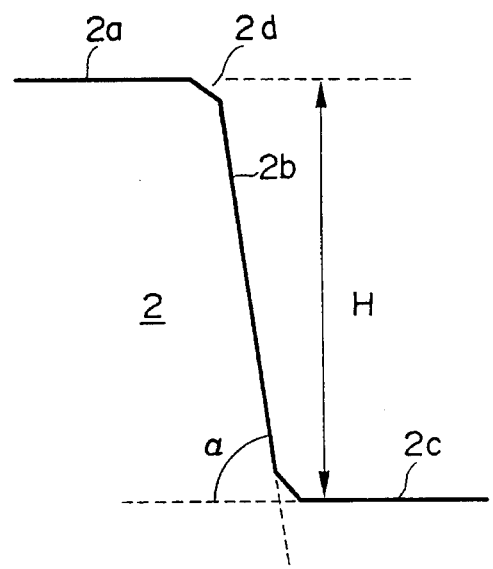
FIGS. 15A–15B are enlarged drawings of rail tapered angles α.
Figure 15B:
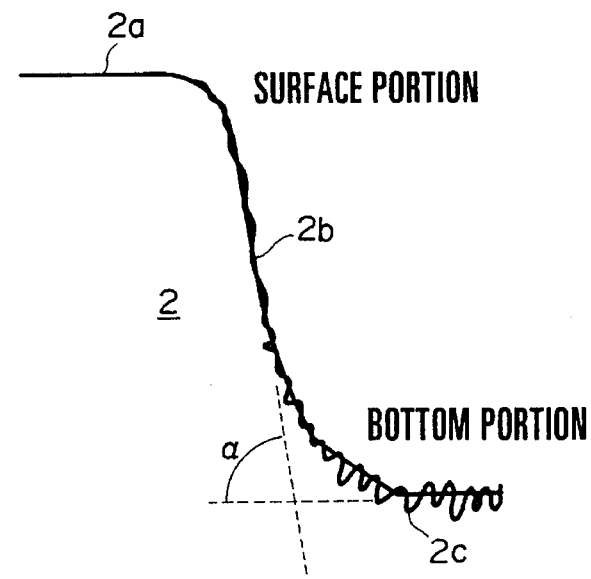

In FIG. 15 are shown enlarged drawings of the tapered angles α of the rails 2 formed in the first and second Examples. The sides 2b and bottoms 2c of the rails 2 formed actually, have large and small unevennesses. Particularly in the second Example, there are large unevennesses as seen in FIG. 15B. The rail tapered angle α, when there is no unevenness on the rail 2 as in FIG. 15A, is simply an angle shown, formed by the rail side 2b and the rail bottom 2c.

Meanwhile, when there are large unevennesses as in FIG. 15B, the rail tapered angle differs greatly by the top portion, middle portion and bottom portion of the rail side 2b. In such a case, the rail tapered angle α is determined by connecting each center of the unevennesses of each portion to draw a straight line and measuring the angle formed by the straight line and the rail bottom 2c.

When the inclination of rail side 2b can be approximated only by a plurality of straight lines, the average inclination of these straight lines is calculated; the average inclination is regarded as a straight line forming the rail side 2b; and a rail tapered angle α is determined.

Figure 16:
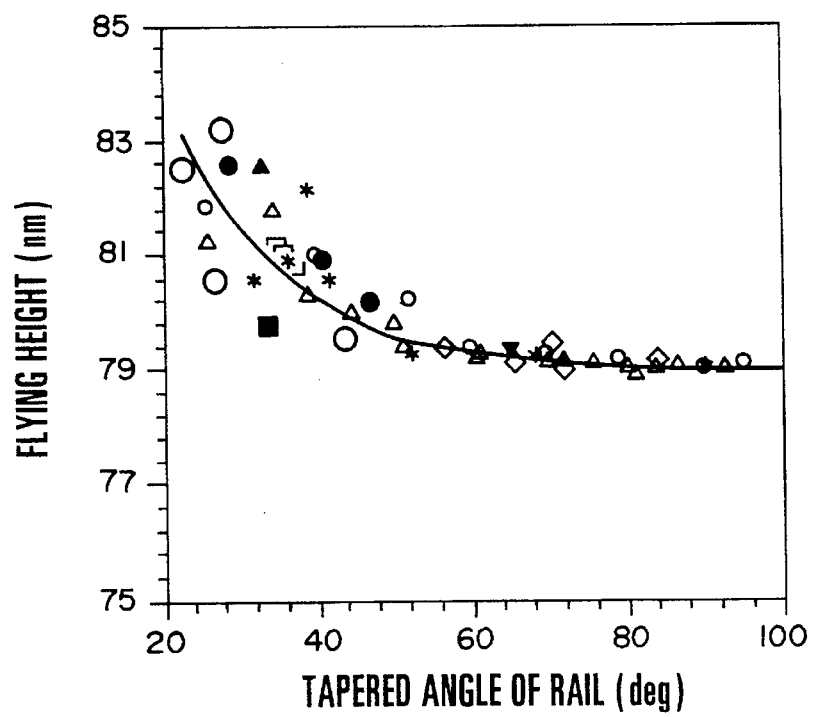
FIG. 16 provides experimental data showing the relation between rail tapered angle α and flying amount.

Next, by referring to FIG. 16, there are described the flying characteristics of magnetic heads each having a rail 2 formed by the method of the first and second Example.

Figure 29:
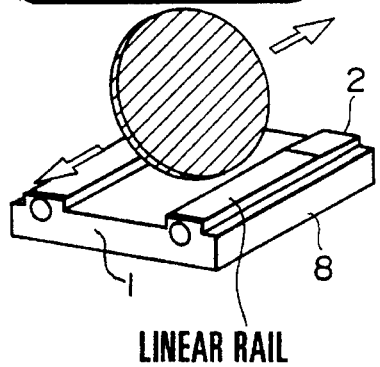
FIGS. 29A–29B are drawings each showing a magnetic head shape and a method for rail formation on said magnetic head.
Figure 29:
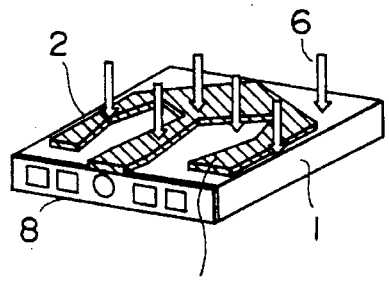

FIG. 16 provides experimental data showing the relation between rail tapered angle α and flying characteristic. In FIG. 16, there were used magnetic heads each having a minimum rail width of 100 μm and a constant rail groove depth H of 6 μm but having different rail tapered angles α. As shown in FIG. 16, the variation in flying height is large when the rail tapered angle α is about 55° or smaller. In contrast, when the trail tapered angle α is 55° or larger, the variation in flying height is small and the flying height is nearly constant and stable. The reason is not clarified but is presumed to be that when the rail tapered angle α is 55° or smaller, the rail side 2b shown in FIG. 15 has an influence on the flying characteristic and the increase in area of said side gives a variation in flying height. That is, it is presumed that in the case of a non-linear rail as shown in FIG. 29B, said side receives the pressure of air from various directions and this incurs a variation in flying height.

It is presumed that the above-mentioned relation between rail tapered angle α and variation in flying height is not brought about by the processing variations seen during rail 2 formation, but is connected with the geometrical shape of rail 2.

As shown in FIG. 16, when the rail tapered angle α exceeds 85°, the stability of flying height has no problem, but the adhesion of dust on the top surface and sides of rail 2 is more probable and there arise problems other than flying height stability in some cases. Not shown in FIG. 16 but, when the rail tapered angle α exceeds 85° and when there is crush between magnetic head and magnetic disc, the force which the magnetic disc receives from the edge of slider rail, is larger, easily damaging the recording surface of magnetic disc in some cases.

The tendency of variation in flying height, as shown in FIG. 16 is the same also when the rail width is changed or when the rail groove depth H is changed, although the absolute value of flying height changes.

In the first and second Examples, there was used a rail substrate made of an alumina titanium carbide type ceramic. The effects of these Examples are not restricted only to when said substrate is used, and are applicable also to when there is used a rail substrate made of other ceramic (e.g. $Al_2O_3 \cdot Fe_2O_3 \cdot TiC$, $Al_2O_3 \cdot TiO_2$ or SiC—Si), glass, crystals (e.g. Zn-ferrite) or the like.

By referring to FIGS. 17 and 18, description is made on the third Example regarding a process for production of thin film magnetic rails, which process is more specific than those in the first and second Examples.

Figure 17A:
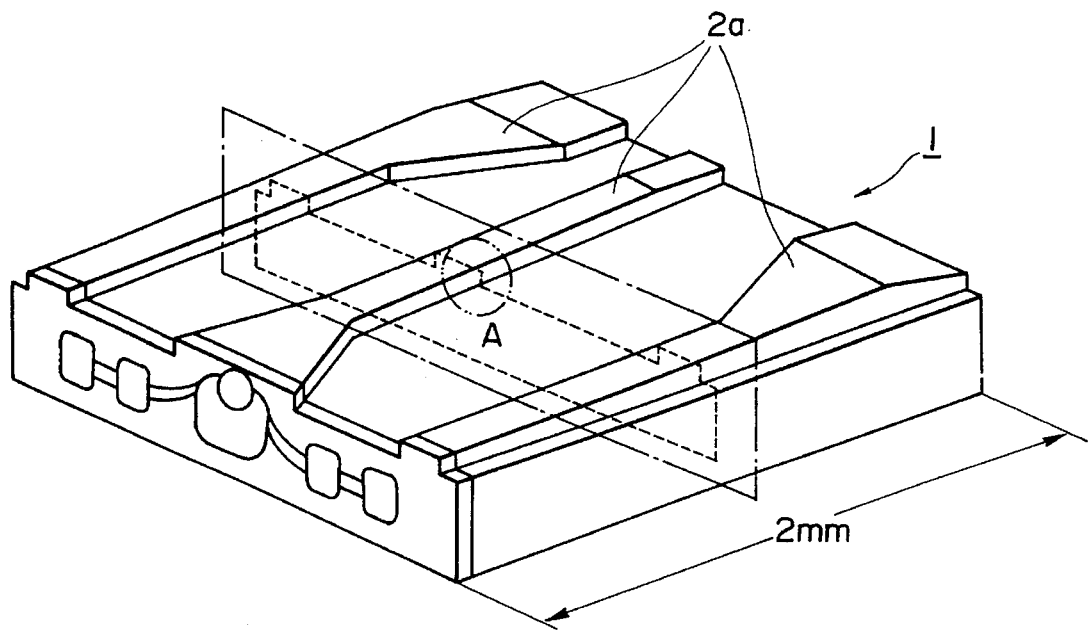
FIGS. 17A–17B are perspective views of magnetic head rails and a fragmentary enlarged sectional view thereof.
Figure 17B:
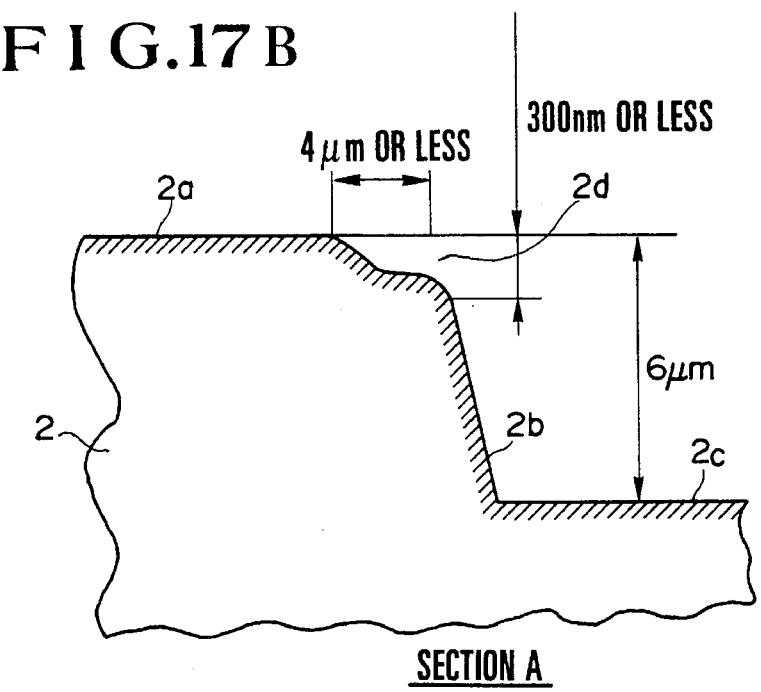

FIG. 17A is a perspective view of magnetic head rails and FIG. 17B is a fragmentary enlarged sectional view thereof, and FIG. 18A and 18D are drawings explaining a process for rail formation.

First, an alumina type ceramic substrate of 3 in. in diameter and 2 mm in thickness, in which thin film magnetic elements corresponding to, for example, total 480 rails (20 rails lengthwise and 24 rails crosswise) are formed, is cut into blocks of 20 rows (lengthwise) and 2 rows (crosswise). In this case, the size of each one block is 2 mm×30 mm×0.48 mm and each block can be processed so as to have 12 rails 2 each of 2 mm×0.48 mm×1.5 mm. The cutting can be made with a whetstone but may be made by discharging or by the use of a laser beam.

The top surface 2a of each block (the surface which is to become a rail top surface) is polished so that the surface 2a after polishing has a roughness Rmax of 5 mm or smaller.

The resulting blocks are arranged on a jig for rail formation, of 3 in. in diameter and 4 mm in thickness. In this case, the blocks are arranged in 20 rows (lengthwise) and 2 rows (crosswise) with each surface 2a directed upward and each magnetic element portion placed at the front. The blocks are adhered onto the jig with a conductive film adhesive.

On the surface 2a of each block arranged on the jig is formed a protective film by sputtering. The thickness of the protective film was 5 mm (silicon), 5 mm (carbon) and 5 mm (silicon).

Then, on each resulting block is coated an organosilicon type positive resist by the use of a roll coater, as shown in FIG. 18A, so that the resist film after prebaking has a thickness of 7±1.3 μm.

Thereafter, light exposure and development are conducted to form a desired two-dimensional pattern on each rail 2. The apparatus for light exposure may be a projection type allowing exposure in the lump, or may be a stepper type allowing for high-accuracy patterning even when the blocks arranged on the jig have different heights. Next, after-baking is conducted to evaporate the organic solvent from the resist and fire the resist. The resulting resist had a tapered angle of 78°.

Then, ion beam etching as shown in FIG. 18B is conducted. Flon 134a ($CH_2FCF_3$, 1,1,1,2-tetrafluoroethane and 1,1,2,2-tetrafluoroethane) is used an ion source gas. When flon 134a alone is used, a deposit is formed on the resist film; the width of rail 2 becomes larger than the rail width of resist pattern; and moreover the accuracy of rail width is ±4 μm and not stable. Therefore, Ar is used together with flon 134a. By changing the flow rates of the two gases, it is possible to change the selectivity of resist mask to alumina titanium carbide (the ratio of the etching rate of alumina titanium carbide to the etching rate of resist mask). In place of Ar, there may be used a rare gas such as Xe, He or the like to mix with flon 134a. While the flow rates of gases differ by the apparatus used, the processing conditions employed, the required selectivity, etc., the flow rate of Ar gas was 7.5 sccm and that of flon 134a was 7.5 sccm in the ion beam etching apparatus used in the present Example.

Gas discharging is made from the vacuum chamber of an ion beam etching apparatus by the combined use of a rotary pump or a dry pump and a turbo molecular pump so that the vacuum in the vacuum chamber becomes $4.0 \times 10^{-4}$ or lower. As the ion beam etching apparatus, there was used an ion sourse of a type generating ions by electron impact wherein thermal electrons were emitted from a filament (a cathode) to ionize an ion source gas.

Next, thermal electrons are emitted from a neutralizer toward a stainless steel shutter (a shield placed between an acceleration electrode and a material to be processed) so that the shutter beam current flowing through the shutter becomes zero ampere, whereby electrical neutralization is conducted. This is conducted to prevent a possibility that the charge-up of said material to be processed, caused by collision of a large amount of positive ions, invites decrease in times of positive ion collision with the material to be processed and consequent decrease in etching rate.

As the conditions for etching have been prepared as above, the shutter is opened to start etching. The incident angle of ion beam was 0° and a cooling water of 0° C was circulated to prevent the burning of resist. The etching rate of alumina titanium carbide is 0.7 Nmh and that of resist is 0.2 Nmh; therefore, the selectivity is 3.5. Since the alumina titanium carbide must be processed at a depth H (a rail groove depth H) of 6.0 μm, etching was conducted for 8.57 hours. Thereby, a state of FIG. 18C is obtained.

Next, RIE by oxygen is conducted to process each edge of the top surface 2a. The conditions for RIE are oxygen flow rate=50 sccm, vacuum=50 mTorr, bias DC voltage=370 V, high-frequency electric power=100 w, frequency=13.56 MHz, opposing electrode=carbon electrode, and distance between electrodes=125 mm.

By conducting RIE for 20 minutes under the above conditions, the resist was processed and regressed by a width of 4 μm and the portion of rail material beneath the resist, exposed by the regression could be etched by a depth of 300 nm. As shown in FIG. 17B and FIG. 18D, since the edge 2d is etched simultaneously with the regression of the resist side, the sectional shape of rail after RIE is such that the rail top surface 2a is etched more (larger depth) at the edge 2d and less (smaller depth) at the inner portion. The processing amount of the edge 2d of rail top surface 2a can be controlled by the conditions of RIE. Since the change of said conditions results in change in the balance between the regression amount of resist and the processing rate of rail material, it is possible to vary thereby the sectional shape of edge 2d after processing. The material after RIE, is immersed in a solution for resist removal, such an organic solvent (e.g. NMP or acetone), to remove the resist. In the present Example, said material was immersed for 20 minutes in a vessel containing NMP of 80° C. while adding, to the vessel, ultrasonic vibration generated by an ultrasonic oscillator.

Each block after the above process, in which rails 2 are formed, is separated from the jig and is cut into individual rails 2 by a whetstone. Each rail 2 is washed and integrated into a magnetic disc device.

Next, by referring to FIG. 19, there are described the fourth and fifth Examples each regarding other specific process for production of thin film magnetic head rail.

FIGS. 19A to 19D are drawings explaining a process for rail formation, similar to FIG. 18.

In FIG. 18, the balance of the regression amount of resist side and the processing rate of rail material was controlled by the conditions of RIE. Said balance can be varied also by the conditions of ion beam etching. The selectivity was 3.5 in the third Example but, in the fourth Example, the selectivity was 4.0 or larger and two-step inclinations were formed at each side of resist as shown in FIG. 19C. This formation of two-step inclinations is made possible by formation of a so-called "redeposition layer". That is, it is made possible by a phenomenon that during the ion beam etching shown in FIG. 19C, part of the resist particles sputtered by the collision of ions with each resist side re-adheres readheres (redeposits) on the resist side or the portion of rail top surface 2a, exposed by the regression of resist side. During the ion beam etching, not only the resist side regresses but also the tapered angle of resist decreases. This makes easy the adhesion of the sputtered resist particles on the portion of rail top surface 2a, exposed by the regression of resist side.

In order to obtain an increased selectivity, the flow rate of flon 134a is increased or the flow rate of rare gas (e.g. Ar) mixed with flon 134a is decreased, in ion beam etching. For example, when the flow rate of flon 134a is controlled at 10 sccm and that of Ar is controlled at 5 sccm, there is obtained a selectivity of 5.0. In this case, there was substantially no change in processing rate of rail material and the upper layer of resist was processed by about 1.2 μm. The regression amount of rail side was 0.5 μm.

Then, each edge of rail top surface 2a was processed under the same conditions as in the third Example, whereby the edge 2d as shown in FIG. 17B or FIG. 19D was formed. The regression amount of resist side was larger than in the third Example; the edge 2d of rail top surface 2a was larger in width (4 μm) than in the third Example; and the rail groove depth H was 300 nm outside the rail 2.

According to a fifth Example formation of a redeposition layer on each side of the resist after ion milling etching can be made not only by making the selectivity large but also by making small the thickness of the resist film formed. By making small the thickness of the resist film formed, the regression rate of each resist side becomes small and a redeposition layer can be formed. Also, defocussing may be used during the light exposure of the resist. By defocussing, the tapered angle of the resist becomes small; sputtered particles re-adhere easily on the top surface 2a; the regression rate of each resist side becomes small. For example, when ion beam etching and RIE were conducted at a mask film thickness of 4 μm under the same conditions as in the third Example, there was formed an edge 2d having the same sectional shape as in the fourth Example.

Various Examples each relating to a process for etching using an etching gas are described by referring to FIGS. 20 to 27.

Figure 20A:
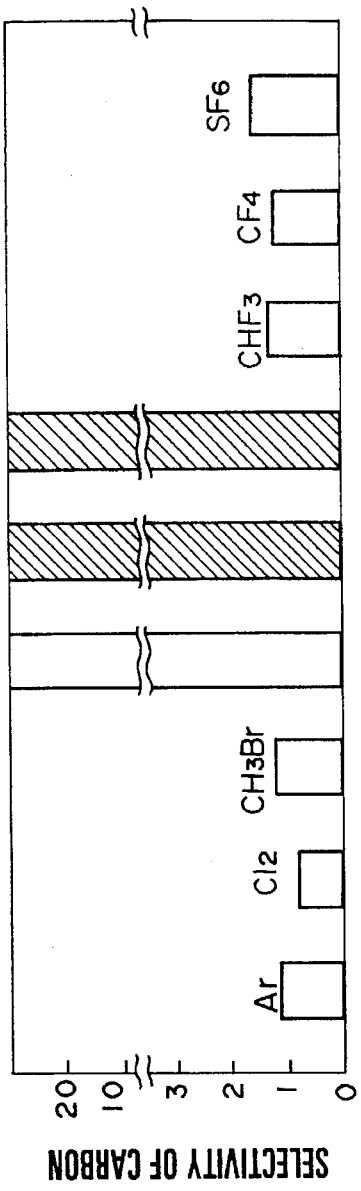
FIGS. 20A–20B are bar graphs showing the milling rates and selectivities of various gases.
Figure 20B:
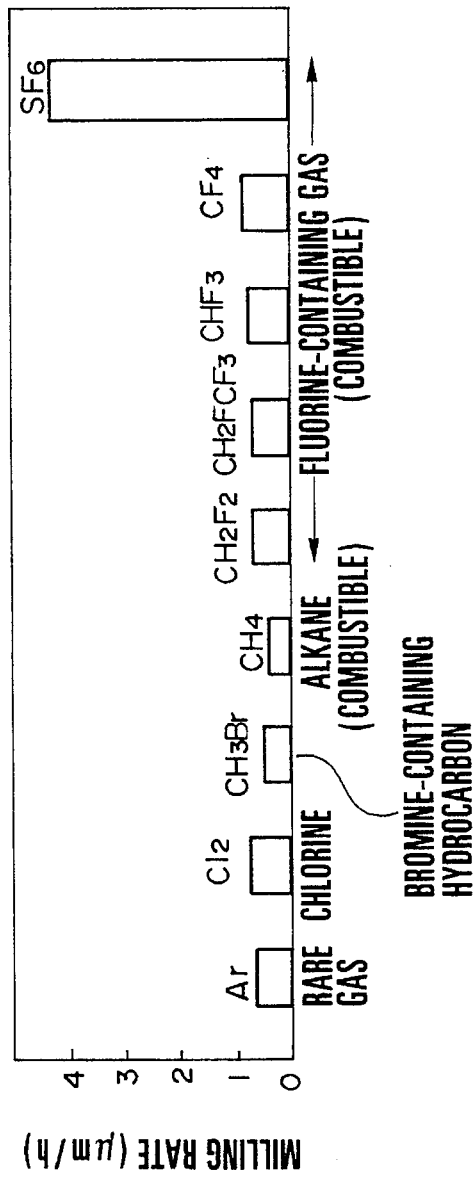
Figure 21:
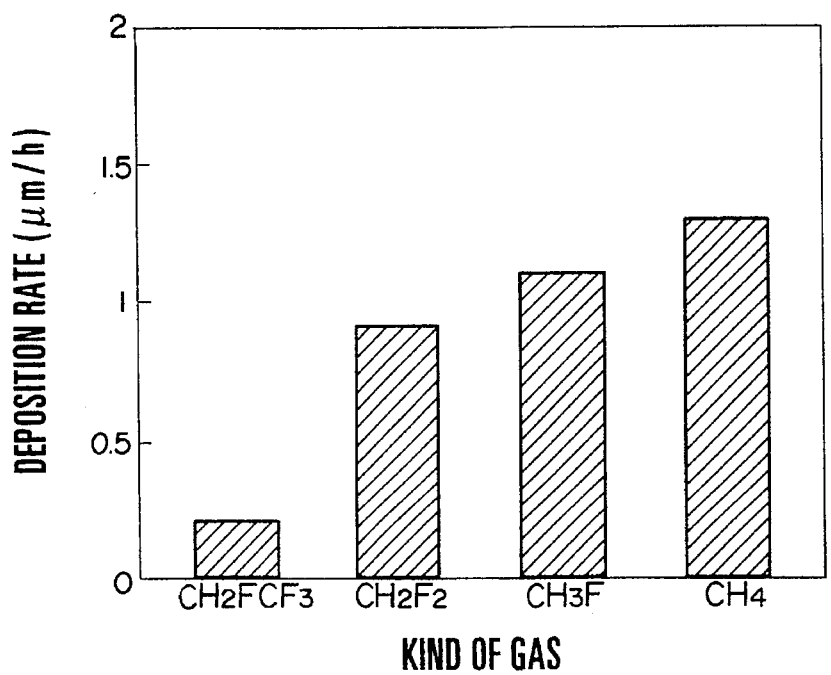
FIG. 21 is a bar graph showing deposition rates on carbon films.
Figure 22:
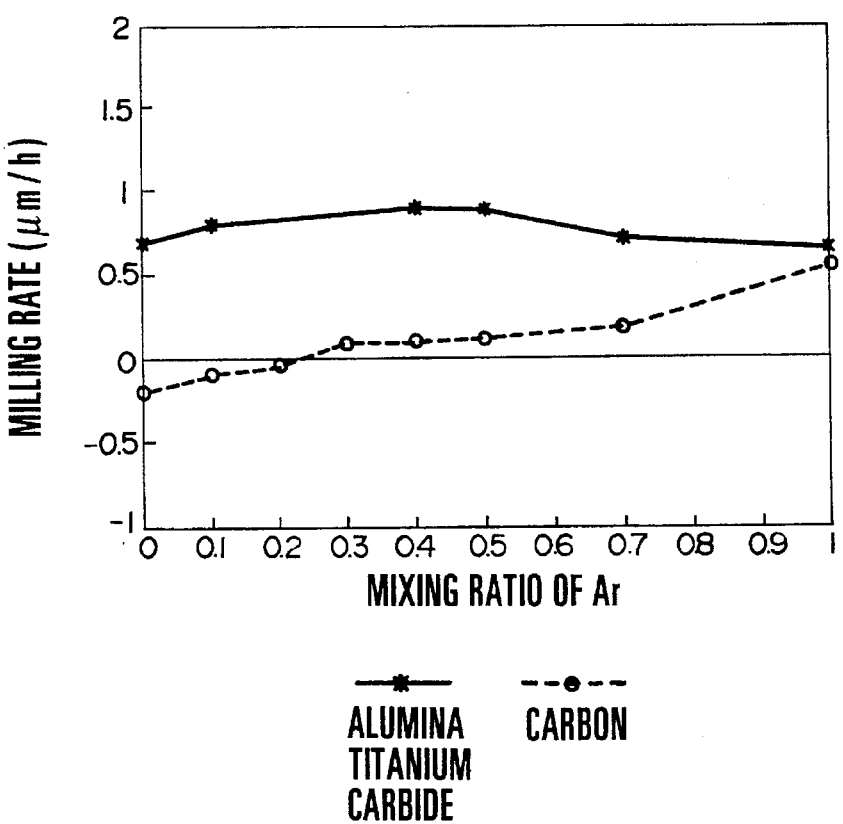
FIG. 22 is a broken line graph showing the milling rates of alumina titanium carbide and carbon when a mixed gas of $CH_2FCF_3$ and Ar was used.
Figure 23:
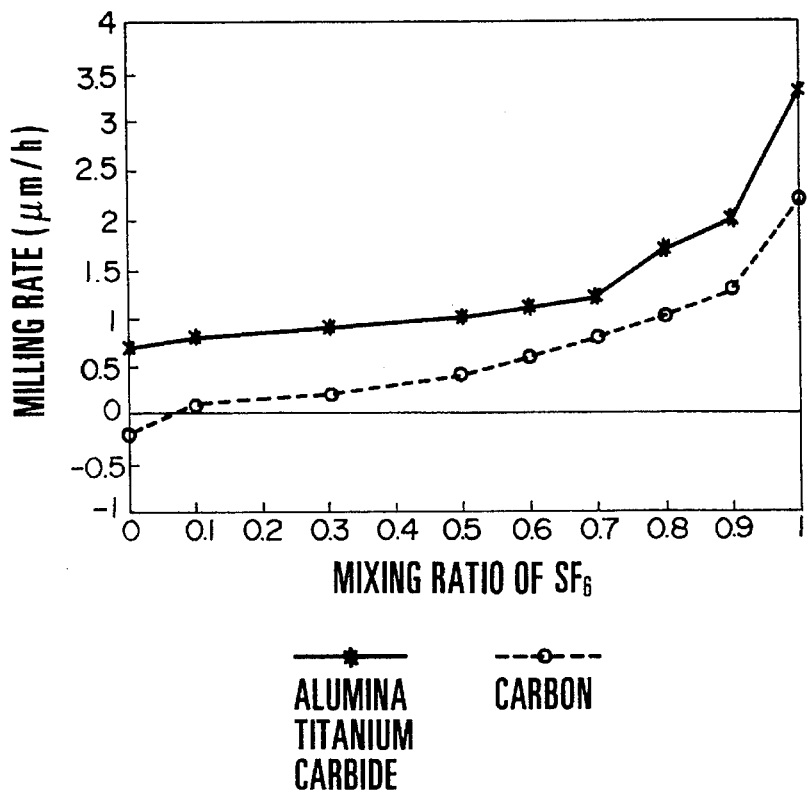
FIG. 23 is a broken line graph showing the milling rates of alumina titanium carbide and carbon when a mixed gas of $CH_2FCF_3$ and $SF_6$ was used.
Figure 24:
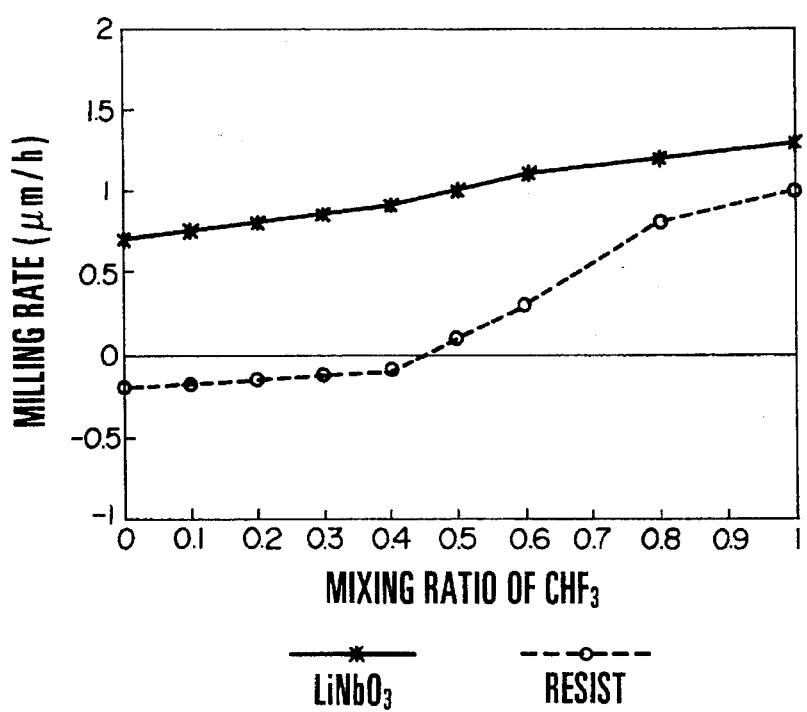
FIG. 24 is a broken line graph showing the milling rates of $LiNbO_3$ and a resist when a mixed gas of $CH_2FCF_3$ and $CHF_3$ was used.
Figure 25:
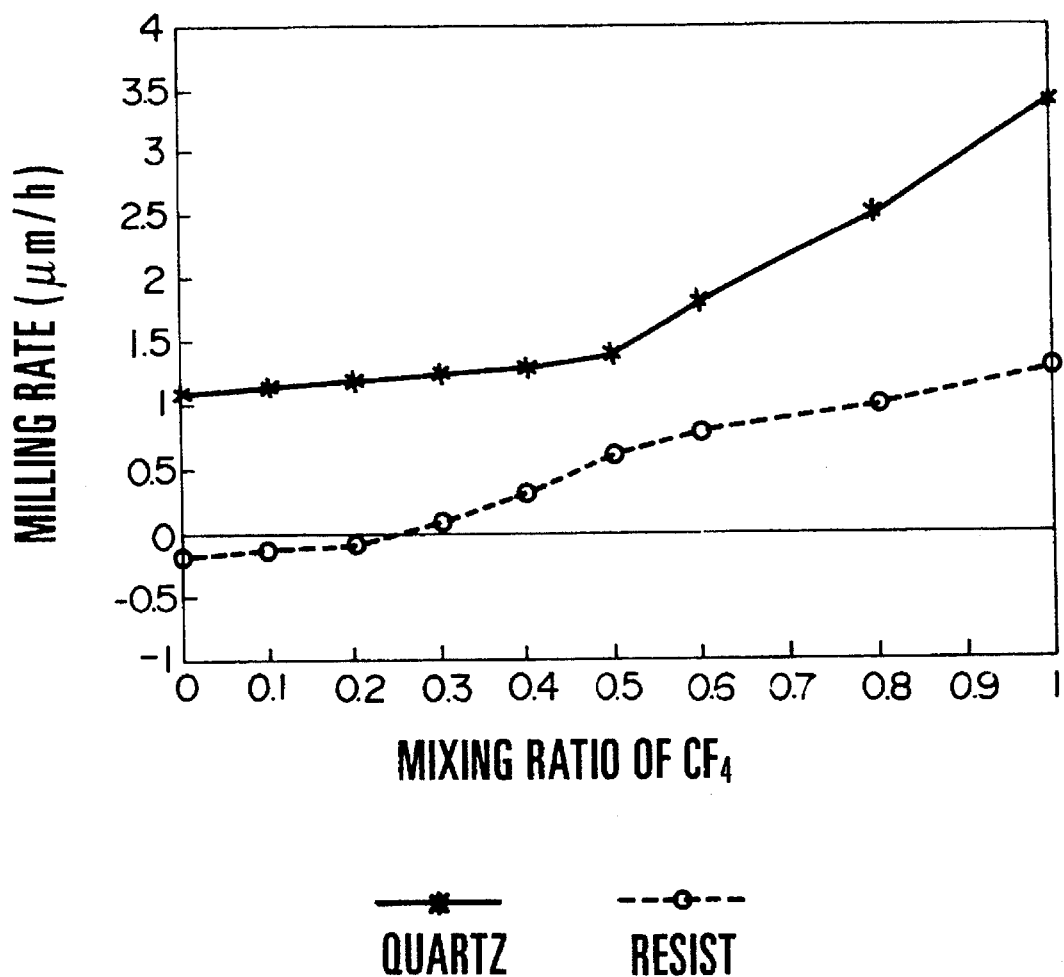
FIG. 25 is a broken line graph showing the milling rates of quartz and a resist when a mixed gas of $CH_2FCF_3$ and $CF_4$ was used.

FIGS. 20A and 20B are bar graphs showing the milling rates and selectivities of various gases; FIG. 21 is a bar graph showing deposition rates on carbon films; FIG. 22 is a broken line graph showing the milling rates of alumina titanium carbide and carbon when a mixed gas of $CH_2FCF_3$ and Ar was used; FIG. 23 is a broken line graph showing the milling rates of alumina titanium carbide and carbon when a mixed gas of $CH_2FCF_3$ and $SF_6$ was used; FIG. 24 is a broken line graph showing the milling rates of $LiNbO_3$ and a resist when a mixed gas of $CH_2FCF_3$ and $CHF_3$ was used; FIG. 25 is a broken line graph showing the milling rates of quartz and a resist when a mixed gas of $CH_2FCF_3$ and $CF_4$ was used; FIGS. 26A to 26G are schematic drawings showing a process for slider formation on an alumina titanium carbide substrate; and FIG. 27 is a plan view showing the rail surfaces of the thin film magnetic head formed by the process of FIGS. 26A to 26G.

The sixth Example is described by referring to FIGS. 20, 21.

The present Example is a case in which an alumina titanium carbide substrate is processed by ion milling using carbon as a mask, wherein the properties of $CH_2FCF_3$ gas (an etching gas usable in the etching process of the present invention) (both 1,1,1,2-tetrafluoroethane and 1,1,2,2-tetrafluoroethane can be used) are compared with the properties of other gases used in the conventional technique.

First, the terms used hereinafter are defined.

"Milling rate" refers to a rate at which a material to be processed or a mask is processed by ion etching. "Etching rate" refers to a rate at which a material to be processed or a mask is processed when etching is conducted in a larger area.

"Selectivity" refers to a ratio of the milling rate (or etching rate) of a material to be processed, to the milling rate (or etching rate) of a mask. It is represented by the following expression.

Selectivity=(milling rate of material to be processed)(milling rate of mask) or (etching rate of material to be processed)(etching rate of mask)

A deposit is formed on a mask during etching. A rate at which the deposit is formed, is called a "deposition rate".

FIGS. 20A and 20B show a comparison of selectivities when various gases were used (in all cases, the material to be processed was alumina titanium carbide and the mask was carbon).

$CH_4$, $CH_2F_2$ and $CH_2FCF_3$ each gave a deposit on the carbon mask and gave an infinite selectivity. That is, the mask is not processed by any of these gases.

When one of these gases is used, therefore, a very thin mask is sufficient regardless of the processing amount. This can shorten the time required for mask formation when, for example, a sputtered film (e.g. a carbon film) is used. A thin mask also has a merit of good patterning accuracy.

As shown in FIG. 21, deposition rate differs by the kind of the gas used. That is, $CH_4$ and $CH_2F_2$ give a deposition rate of about 1 μmh, while $CH_2FCF_3$ gives a very small deposition rate of about 0.2 μmh, which is about ⅕ of $CH_2F_2$. Further, deposition rate varies generally by about ±10~20%. Consequently, variation in mask thickness is large when deposition rate is as large as 1 μmh.

Generally, during ion milling, a mask regresses gradually and its width becomes smaller as compared with the width right after mask formation. The regression amount (dimensional shift) of mask depends upon the thickness and milling rate of mask. Consequently, variation in mask thickness gives variation in pattern width after milling. When $CH_2FCF_3$ gas is used, therefore, the deposition rate and the variation thereof are small as compared with when $CH_4$ or $CH_2F_2$ is used, providing higher processing accuracies.

Further, $CH_2FCF_3$, being a incombustible gas and requiring no special measure for toxicity, corrosiveness, etc., is readily applicable to existing mass production facilities.

The seventh Example is described by referring to FIG. 22.

The present Example is a case in which ion milling is conducted using, as a mask, a carbon film and, as a material to be processed, an alumina titanium carbide substrate and using, as an etching gas, a mixed gas of $CH_2FCF_3$ and Ar. Also in this case, there can be expected the same effect as in the sixth Example using $CH_2FCF_3$ alone as an etching gas.

By referring to FIG. 22, there is described a unique effect shown when Ar is mixed. In FIG. 22, a minus value of carbon milling rate indicates that a deposit is formed on the carbon film mask. Accordingly, the Ar mixing percentage of about 24% at which the carbon milling rate changes from minus to plus, is a transitional point from deposit formation on mask to etching of mask.

Consequently, at or in the vicinity of the above mixing ratio, both deposition rate and milling rate are very small; the change in mask dimension is very small; and the milling conditions are suitable for etching of material to be processed and the dimensional accuracies in etching are increased significantly.

Further, etching at a mixing ratio of 24% or higher gives no deposit on the mask, requiring no step for deposit removal.

Furthermore, since Ar gas is a physically inactive gas, when a mixed gas of $CH_2FCF_3$ and Ar is used, a sufficient milling rate can be obtained even for a material (e.g. Pt) giving a relatively small ion milling rate when a fluorine-containing substance is used as an etching gas.

The eighth Example is described by referring to FIG. 23.

The present Example is a case in which ion milling is conducted using, as a mask, a carbon film and, as a material to be processed, an alumina titanium carbide substrate and using, as an etching gas, a mixed gas of $CH_2FCF_3$ and $SF_6$. Also in this case, there can be expected the same accuracy improvement in etching as in the sixth Example using $CH_2FCF_3$ alone as an etching gas.

That is, as shown in FIG. 23, when $SF_6$ is added to $CH_2FCF_3$, the milling rate of carbon film changes from minus to plus when the mixing ratio of $SF_6$ is considerably small as compared with when, for example, Ar is added. Consequently, at that timing, there occurs the reversion of deposit formation and mask etching on the carbon mask.

Also when a mixed gas of $CH_2FCF_3$ and $SF_6$ is used as an etching gas, the milling rate of alumina titanium carbide is considerably large as compared with when $CH_2FCF_3$ alone is used, making the mixture a preferable etching gas.

The ninth Example is described by referring to FIG. 24.

The present Example is a case in which ion milling is conducted using, as a material to be processed, a $LiNbO_3$ substrate and, as a mask, a resist and using, as an etching gas, a mixed gas of $CH_2FCF_3$ and $CHF_3$. There can be obtained the same effect as in the eighth Example using a mixed gas of $CH_2FCF_3$ and $SF_6$ as an etching gas. As shown in FIG. 24, the highest accuracy is expected at or in the vicinity of a $CH_2FCF_3$-$SF_6$ mixing ratio of 45%.

As shown in FIG. 24, the milling rate of $LiNbO_3$ is 0.7 μmh when $CH_2FCF_3$ alone is used as an etching gas, and is 0.9 μmh at or in the vicinity of a $CH_2FCF_3$-$SF_6$ mixing ratio of 45%, which is as large as about 1.3 times.

The tenth Example is described by referring to FIG. 25.

The present Example is a case in which reactive ion etching is conducted using, as a mask, a resist and, as a material to be processed, a quartz substrate and using, as an etching gas, a mixed gas of $CH_2FCF_3$ and $CF_4$. Also in this case, there can be obtained the same accuracy improvement as in the eighth and ninth Examples. As shown in FIG. 25, the optimum conditions are at or in the vicinity of a $CH_2FCF_3$-$CF_4$ mixing ratio of 25%.

Figure 26:
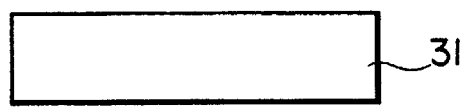
FIGS. 26A–26G are schematic drawings showing a process for slider formation on an alumina titanium carbide substrate.
Figure 26:
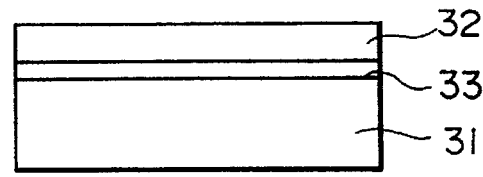
Figure 26:
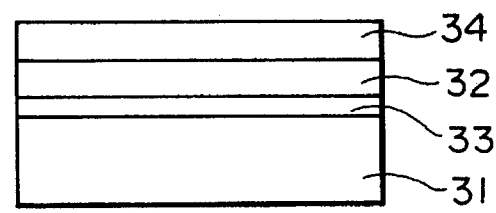
Figure 26:
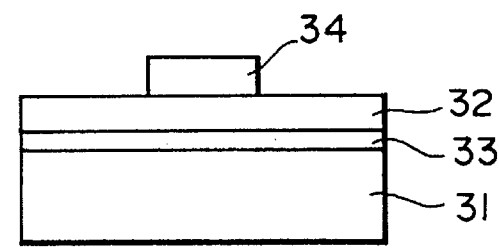
Figure 26:
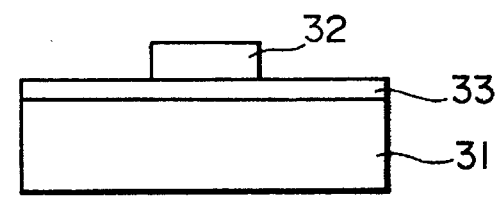
Figure 26:
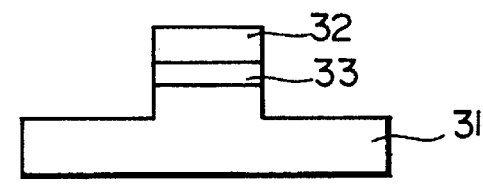
Figure 26:
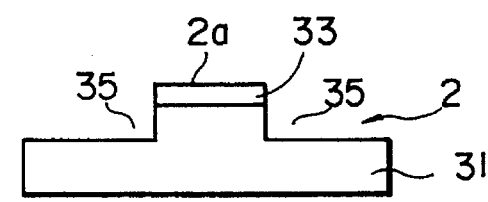
Figure 27:
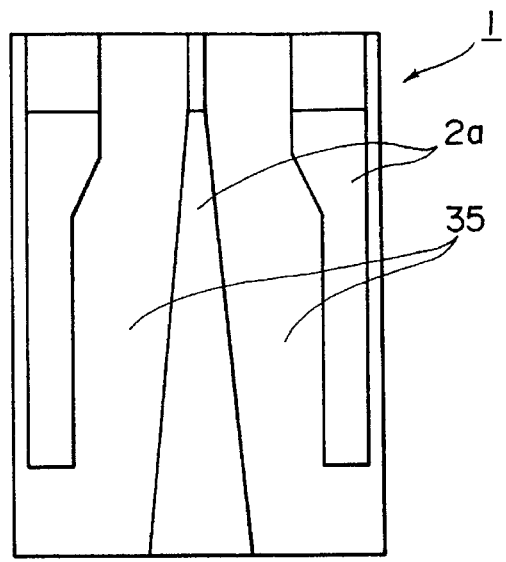
FIG. 27 is a plan view showing the rail surfaces of the thin film magnetic head formed by the process of FIG. 26.

The eleventh Example is described by referring to FIG. 26 and FIG. 27.

The process of the present Example is explained in order by referring to drawings. FIG. 26A shows an alumina titanium carbide 31 obtained by, after formation of magnetic elements, cutting in blocks and polishing them. As shown in FIG. 26B, on the alumina titanium carbide 31 is formed, by sputtering, a protective film 33 consisting of an inorganic thin film of Si, C, SiC or the like; and then a carbon film (a mask) 32 is formed by sputtering.

Next, as shown in FIG. 26C, a resist (a photosensitive material) 34 is coated on the carbon film 32. Light exposure and development are conducted to obtain a rail shape as shown in FIG. 26D. Thereafter, oxygen etching is conducted to etch the carbon film 32 and the resist 34 is removed, as shown in FIG. 26E.

Then, as shown in FIG. 26F, ion milling is conducted using the carbon film 32 as a mask to etch the protective film 33 and alumina titanium carbide 31 to form a rail 2. In the present Example, a mixed gas of $CH_2FCF_3$ and Ar is used as an etching gas in this step.

After the above ion milling, oxygen etching is conducted to remove the carbon film 32 remaining as a mask, as shown in FIG. 26G.

FIG. 27 shows the rails of magnetic head 1, formed using the process of the present Example. In this case, the depth H of each rail groove 35 was about 10 μm, and the smallest width of rail surfaces 2a was about 100 μm.

The above process using a mixed gas of $CH_2FCF_3$ and Ar as an etching gas in ion milling, is compared with a conventional process using a mixed gas of Ar and $CF_4$ as an etching gas in ion milling.

In the formation of rail 2, the variation in width of rail top surface 2a is required to be ±2 μm or smaller because said width has a close connection with the flying amount of magnetic head 1.

In the conventional process, since a mixed gas of Ar and 27% of $CF_4$ was used, the milling rate of alumina titanium carbide 31 was 1.0 μmh, the milling rate of carbon film 32 was 0.6 μmh, and the selectivity was 1.67. Ion milling was conducted under the above conditions, wherein the dimensional accuracy of the width of rail top surface 2a was ±5 μm and the variation in flying amount was as large as ±0.02 μm. Further, about 15 hours were needed to form a carbon mask having a required thickness of about 9 μm.

Meanwhile, in the present Example using a mixed gas of $CH_2FCF_3$ and Ar, at an Ar mixing ratio of 40%, the milling rate of alumina titanium carbide 31 was 0.9 μmh, the milling rate of carbon film 32 was 0.03 μmh, and the selectivity was 30. Ion milling was conducted under the above conditions and using a carbon film 32 of 3 μm in thickness as a mask, wherein the dimensional accuracy of the width of rail top surface 2a was ±1.5 μm. Since the width accuracy can be thus controlled at 2 μm or smaller, the variation in flying amount can be made as small as ±0.006 μm and, moreover, the time for formation of carbon film 32 can be shortened to about 5 hours.

Since the dimensional accuracy of the width of rail top surface 2a can be controlled at ±2 μm or smaller by the above process, it also becomes possible to supply a magnetic head 1 giving a flying amount of 0.15 μm or smaller, stably and in a large number.

The twelfth Example is described.

The present Example is a case in which ion milling is conducted using a resist as a mask, an alumina film as a material to be processed and a mixed gas of $CH_2FCF_3$ and 50% of $CHF_3$ as an etching gas to form a magnetic element. Also in this case, there can be obtained the same accuracy improvement as in the eleventh Example. For example, when an alumina film is processed using a resist of about 1 μm as a mask, the dimensional shift in pattern width is almost zero.

Figure 28:
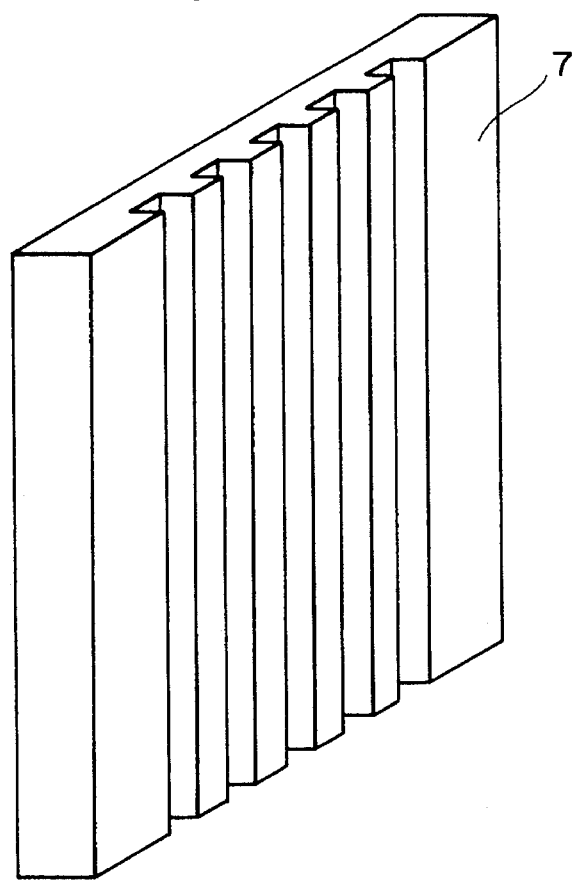
FIG. 28 is a perspective view showing a diffraction grating formed by a process using an etching gas.

The thirteenth Example is described by referring to FIG. 28.

FIG. 28 is a perspective view showing a diffraction grating obtained by a process using an etching gas.

The present Example indicates that the above processes using an etching gas are effective also when a diffraction grating is formed by processing a $LiNbO_3$ substrate using a resist as a mask.

A diffraction grating was conventionally formed by conducting ion milling using a resist of about 2 μm as a mask and $CHF_3$ as an etching gas. At that time, the milling rate of $LiNbO_3$ was 1.3 μmh, the milling rate of resist was 1.0 μmh, and the selectivity was 1.3. Since the milling rate of resist is too large, ion milling of long time results in gradual thinning of resist during etching and finally in disappearance of resist. Hence, the depth of rail groove 35 was about 4 μm in the largest case. Further, the tapered angle α of rail after processing is about 45° (i.e. a trapezoid) and the resulting product, when used as a diffraction grating, generates a diffracted light of higher order in a large amount; as a result, no satisfactory efficiency could be obtained.

Meanwhile, when a mixed gas of $CH_2FCF_3$ and 50% of $CHF_3$ is used, the milling rate of resist is controlled at about zero and a selectivity of 10 or larger is obtained, making it possible to obtain a groove depth of 5 μm or larger. Further, the tapered angle is controlled at about 70° making it possible to obtain a diffraction grating usable as an optical element.

The fourteenth Example is described.

When a high dielectric (e.g. lead zirconate titanate) is processed by a process using the abovementioned etching gas of the present invention, an etching rate of 0.4 μmh or larger can be obtained. Further, fine grooves having a pitch of 1 μm or smaller can be formed. Thus, the present process is applicable for formation of semiconductor elements such as large-capacity semiconductor memory, semiconductor flash memory and the like.

The fifteenth Example is described.

Metals such as Cu, Pt and the like were difficult to process by the conventional process because of the vary small processing rates. When they are processed using a $CH_2FCF_3$-Ar mixed gas of the present invention, however, an etching rate of 0.2 μmh or larger is obtained and, moreover, fine grooves can be formed. Thus, the present process is applicable for formation of the wiring layer of large-capacity semiconductor memory.

As described above, in the present invention, the width, groove depth and tapered angle of each rail of thin film magnetic head can be formed in desired dimensions, at high accuracies and efficiently; and the resulting magnetic head gives a stable small flying height and is free from head crush. By setting the rail tapered angle at 55°–90°, preferably 55°–85°, not only the variations in processing but also the stability of head flying height can be improved. The flying height expressed by absolute value depends upon the width, groove depth or shape of rail, as mentioned previously. Meanwhile, the stability of flying height is improved greatly by optimizing the rail tapered angle.

The effects of the present invention are described further.

Firstly, the present invention can provide a magnetic head rail shape in which the variation in magnetic flying height is small even when there are variations in mask film thickness, mask tapered angle, ion milling selectivity, etc. and in which the variation in rail width is not adversely affected by the generation of redeposition layer and is small as compared with the variation in rail groove depth, as well as a process for formation of such rail(s). Specifically, the present invention can provide a rail shape in which the rail width accuracy, i.e. the variation in rail width when the rail groove depth is formed so as to give a variation of 1 μm, is 3 μm/μm or smaller, as well as a process for formation of such rail(s).

Secondly, the present invention can provide a process for production of rail(s), wherein in the above formation of rail(s), the chamfering of magnetic head at the air outlet end can be conducted simultaneously.

Thirdly, the present invention can provide a process for production of rail(s), wherein each lengthwise edge of top surface of magnetic head rail can be processed uniformly, accurately and efficiently.

Further, the present invention can provide a process for etching using an etching gas, wherein a material of small etching rate (e.g. a ceramic or a high dielectric) can be processed in a short time, accurately, safely and easily. By using the etching process, there can be obtained a thin film magnetic head, a semiconductor memory, an optical element, etc. each of high accuracy.

What is claimed is:

1. A process for producing a thin film magnetic head having non-linear rail(s), comprising the steps of:

forming a mask composed of a high-molecular substance onto a surface of a substrate having a plurality of magnetic head elements thereon, which substrate is a material to be processed and on which surface said rail(s) are to be formed, thereby making a plurality of head blocks covered with the mask;

mounting, on a holder, the substrate having said head blocks covered with the mask;

rotating said holder having the mounted substrate; and ion milling the surface on which the rail(s) are to be formed while allowing said holder to have an inclination of 15° to 60° to an electrode for ion extraction.

2. A process according to claim 1 wherein a mixed gas of Ar and a fluorinated hydrocarbon gas is used in said ion milling.

3. A process according to claim 1 wherein a gas selected from the group consisting of $SF_6$, a mixed gas of $SF_6$ and Ar, and a mixed gas of $SF_6$ and a fluorinated hydrocarbon gas is used in said ion milling.

4. A process according to claim 1 wherein a positive photoresist is a material for the mask and the mask is formed by coating by the use of a roll.

5. A process for producing a thin film magnetic head having non-linear rail(s), comprising the steps of:

forming a mask on the surface of a magnetic head element on which surface rail(s) are to be formed, conducting dry etching to form rail(s) onto said magnetic head element, dry etching the mask to allow sides of the mask to regress from edges of a rail top surface, and dry etching each rail portion exposed by the regression.

6. A process according to claim 5, wherein, in the step of subjecting the mask to dry etching to allow the sides of the mask to regress, the mask material is redeposited between a new mask side formed by the regression and a layer beneath the mask exposed by the regression.

7. A process according to claim 5, wherein $C_8H_2F_4$ is used as an ion source gas for the dry etching.

8. A process for producing a thin film magnetic head according to claim 5, wherein the mask is a photo-resist of 7 μm or less in thickness, the inclination angle of each side of the mask is smaller than 80°, and the selectivity of ion beam etching is 4.0 or larger.

9. A process for etching with an etching gas, comprising etching a material to be processed with $CH_2FCH_3$ as etching gas by ion milling or reactive ion etching via a mask composed of a material selected from a group consisting of a carbon film, a silicon film, a metal film, a resist and a high-molecular material.

10. A process according to claim 9, wherein a mixed gas of $CH_2FCF_3$ and Ar is used as said etching gas.

11. A process according to claim 9, wherein a mixed gas of $CH_2FCF_3$ and $SF_6$ is used as said etching gas.

12. A process according to claim 9, wherein a mixed gas of $CH_2FCF_3$ and $CHF_3$ is used as said etching gas.

13. A process according to claim 9, wherein a mixed gas of $CH_2FCF_3$ and $CF_4$ is used as said etching gas.

14. A process according to claim 1 wherein a ceramic substrate is used as the material to be processed.

15. A process according to claim 1 wherein a material selected from the group consisting of alumina titanium carbide, alumina and zirconia is used as said material to be processed.

16. A process for forming an optical element, comprising etching an optical crystal or a glass substrate with $CH_2FCH_3$ as etching gas by ion milling or reactive ion etching via a mask composed of a material selected from the group consisting of a carbon film, a silicon film, a metal film, a resist and a high-molecular material.

17. A process for forming a semiconductor element, comprising, a high dielectric film with $CH_2FCH_3$ as etching gas by ion milling or reactive ion etching via a mask composed of a material selected from the group consisting of a carbon film, a silicon film, a metal film, a resist and a high-molecular material.

18. A process for forming a semiconductor element, comprising, etching a material selected from the group consisting of lead zirconate titanate, $BaSrTiO_3$ and $SrTiO_3$ with $CH_2FCH_3$ as etching gas by ion milling or reactive ion etching via a mask composed of a material selected from the group consisting of a carbon film, a silicon film, a metal film, a resist and a high-molecular material.

19. A process for forming a semiconductor element, comprising, etching a metal with $CH_2FCH_3$ as etching gas by ion milling or reactive ion etching via a mask composed of a material selected from the group consisting of a carbon film, a silicon film, a metal film, a resist and a high-molecular material to form a metal wiring layer.

20. A process according to claim 19, wherein said metal to be etched is Cu or Pt.

* * * * *

UNITED STATES PATENT AND TRADEMARK OFFICE
CERTIFICATE OF CORRECTION

PATENT NO.   : 5,567,333
DATED        : 22 October 1996
INVENTOR(S)  : Yasuo HIRA et al.

It is certified that error appears in the above-identified patent and that said Letters Patent is hereby corrected as shown below:

| Column | Line | |
|---|---|---|
| 1  | 51 | Before "air" delete "an". |
| 2  | 4  | Change "in stop" to --when stationary--. |
| 5  | 32 | Change "measure" to --measures--. |
| 9  | 24 | Before "when" change "with" to --to--. |
| 10 | 2  | Change "zig" to --jig--. |
| 11 | 25 | Change "zig" to --jig--. |
| 11 | 35 | Change "FIG." to --FIGS.--. |
| 11 | 52 | Change "zig" to --jig--. |
| 11 | 54 | Change "zig" to --jig--. |
| 12 | 20 | Change "mAcm$_2$." to --mA/cm$_2$.--. |
| 12 | 25 | Change "Al$_2$O$_3$.TiC" to --Al$_2$O$_3$, TiC--. |

UNITED STATES PATENT AND TRADEMARK OFFICE
CERTIFICATE OF CORRECTION

PATENT NO.   : 5,567,333
DATED        : 22 October 1996
INVENTOR(S)  : Yasuo HIRA et al.

It is certified that error appears in the above-identified patent and that said Letters Patent is hereby corrected as shown below:

| Column | Line | |
|---|---|---|
| 12 | 41 | Change "70-880." to --70-88°.--. |
| 13 | 5 | Change "1.3x10°" to --1.3x10$^{-8}$--. |
| 13 | 66 | After "are" delete "is". |
| 14 | 21 | Change "with when" to --to when--. |
| 15 | 38 | Before "between" delete "into". |
| 16 | 16 | Before "between" delete "into". |
| 17 | 7 | Change "Al$_2$O$_3$.TiC" to --Al$_2$O$_3$, TiC--. |
| 17 | 50 | Change "30°-450" to --30°, 45°. |
| 18 | 57 | Change "mAcm$^2$" to --mA/cm$^2$--. |
| 18 | 58 | Change "θ=450" to --θ=45°--. |
| 18 | 60 | Change "Al$_2$O$_3$.TiC" to --Al$_2$O$_3$, TiC--. |

UNITED STATES PATENT AND TRADEMARK OFFICE
CERTIFICATE OF CORRECTION

PATENT NO. : 5,567,333

DATED : 22 October 1996

INVENTOR(S) : Yasuo HIRA et al.

It is certified that error appears in the above-identified patent and that said Letters Patent is hereby corrected as shown below:

| Column | Line | |
|---|---|---|
| 19 | 3 | Change "mAcm$^2$" to --mA/cm$^2$--. |
| 19 | 6 | Change "Al$_2$O$_3$.TiC" to --Al$_2$O$_3$• TiC--. |
| 19 | 10 | Change "Al$_2$O$_3$.TiC" to --Al$_2$O$_3$• TiC--. |
| 19 | 12 | Change "$\mu$mh)" to --$\mu$m/h)--. |
| 22 | 9 | After "carbon gas" insert --as--. |
| 23 | 31 | Change "incurs" to --causes--. |
| 23 | 64 | Change "FIG. 18A and 18D" to --FIGS. 18A to 18D--. |
| 23 | 58 | Change "on" to --of--. |
| 24 | 29 | Change "lump," to --lamp,--. |
| 24 | 37 | After "used" insert --as--. |

UNITED STATES PATENT AND TRADEMARK OFFICE
CERTIFICATE OF CORRECTION

PATENT NO.    : 5,567,333
DATED         : 22 October 1996
INVENTOR(S)   : Yasuo HIRA et al.

It is certified that error appears in the above-identified patent and that said Letters Patent is hereby corrected as shown below:

| Column | Line | |
|---|---|---|
| 24 | 57 | Change "sourse" to --source--. |
| 25 | 7 | Change "Nmh" to --$\mu$m/h--. |
| 25 | 8 | Change "Nmh" to --$\mu$m/h--. |
| 25 | 14 | Change "power=100 w," to --power=100 W,--. |
| 25 | 31 | After "material" insert --,--. |
| 25 | 32 | After "such" insert --as--. |
| 25 | 59 | Delete "readheres". |
| 27 | 22 | Change "$\mu$mh" to --$\mu$m/h--. |
| 27 | 23 | Change "$\mu$mh" to --$\mu$m/h--. |
| 27 | 36 | Change "a" to --an--. |
| 28 | 29 | Change "$\mu$mh" to --$\mu$m/h--. |
| 29 | 56 | Change "$\mu$mh" to --$\mu$m/h-- (both occurrences) |

UNITED STATES PATENT AND TRADEMARK OFFICE
CERTIFICATE OF CORRECTION

PATENT NO.     : 5,567,333
DATED          : 22 October 1996
INVENTOR(S)    : Yasuo HIRA et al.

It is certified that error appears in the above-identified patent and that said Letters Patent is hereby corrected as shown below:

| Column | Line | |
|---|---|---|
| 31 | 42 | After "beam etching" insert --{(etching rate of layer beneath mask)/(etching rate of mask)}--. |
| 32 | 24 | Change "comprising," to --comprising etching--. |

Signed and Sealed this

Twenty-first Day of October 1997

Attest:

BRUCE LEHMAN

Attesting Officer

Commissioner of Patents and Trademarks